US012395800B2

(12) United States Patent
Morris et al.

(10) Patent No.: US 12,395,800 B2
(45) **Date of Patent: *Aug. 19, 2025**

(54) HEARING LOSS AMPLIFICATION THAT AMPLIFIES SPEECH AND NOISE SUBSIGNALS DIFFERENTLY

(71) Applicant: Chromatic Inc., New York, NY (US)

(72) Inventors: Nicholas Morris, Brooklyn, NY (US); Igor Lovchinsky, New York, NY (US); Andrew J. Casper, Inver Grove Heights, MN (US)

(73) Assignee: Chromatic Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,656

(22) Filed: Dec. 20, 2023

(65) Prior Publication Data

US 2024/0121562 A1 Apr. 11, 2024

Related U.S. Application Data

(63) Continuation of application No. 18/366,851, filed on Aug. 8, 2023, now Pat. No. 11,902,747.

(Continued)

(51) Int. Cl.
*H04R 25/00* (2006.01)
*G10L 21/028* (2013.01)

(52) U.S. Cl.
CPC .......... *H04R 25/507* (2013.01); *G10L 21/028* (2013.01); *H04R 25/43* (2013.01); *H04R 25/70* (2013.01); *H04R 2225/43* (2013.01)

(58) Field of Classification Search
CPC ..... G10L 21/028; H04R 25/507; H04R 25/43; H04R 25/70; H04R 2225/43; H04R 25/505
See application file for complete search history.

(56) References Cited

U.S. PATENT DOCUMENTS 9,881,631 B2 1/2018 Erdogan et al.
10,721,571 B2 7/2020 Crow et al.
(Continued)

FOREIGN PATENT DOCUMENTS

EP 0 357 212 A2 3/1990
EP 3694229 A1 8/2020
(Continued)

OTHER PUBLICATIONS

U.S. Appl. No. 18/366,851, filed Aug. 8, 2023, Morris et al..
(Continued)

*Primary Examiner* — Brian Ensey
(74) *Attorney, Agent, or Firm* — Wolf, Greenfield & Sacks, P.C.

(57) ABSTRACT

A hearing aid includes neural network circuitry configured to implement a neural network trained to separate a speech subsignal and a noise subsignal from an input audio signal, and digital processing circuitry. The digital processing circuitry includes a speech wide dynamic range compression (WDRC) pipeline and a noise WDRC pipeline. The speech WDRC pipeline is configured to apply a set of speech fitting curves to the speech subsignal based at least in part on the level of the speech subsignal. The noise WDRC pipeline is configured to apply a set of noise fitting curves to the noise subsignal based at least in part on the level of the noise subsignal. The set of speech fitting curves is different from the set of noise fitting curves.

20 Claims, 16 Drawing Sheets

Related U.S. Application Data

(60) Provisional application No. 63/396,523, filed on Aug. 9, 2022.

(56) References Cited

U.S. PATENT DOCUMENTS

| | | | |
|---|---|---|---|
| 10,795,638 B2 * | 10/2020 | Sabin | G06F 3/167 |
| 10,812,915 B2 | 10/2020 | Santos et al. | |
| 10,957,301 B2 | 3/2021 | Hoby et al. | |
| 11,245,993 B2 | 2/2022 | Andersen et al. | |
| 11,270,688 B2 * | 3/2022 | Lu | G10L 25/30 |
| 11,330,378 B1 | 5/2022 | Jelcicováet al. | |
| 11,375,325 B2 | 6/2022 | Froehlich et al. | |
| 11,553,286 B2 | 1/2023 | Sabin et al. | |
| 11,558,699 B2 | 1/2023 | Durrieu | |
| 2007/0172087 A1 | 7/2007 | Olsen | |
| 2010/0027820 A1 | 2/2010 | Kates | |
| 2015/0078575 A1 | 3/2015 | Selig et al. | |
| 2017/0229117 A1 | 8/2017 | Van der Made et al. | |
| 2020/0043499 A1 | 2/2020 | Basye et al. | |
| 2021/0105565 A1 * | 4/2021 | Pedersen | G06N 3/08 |
| 2021/0289299 A1 | 9/2021 | Durrieu | |
| 2022/0095061 A1 | 3/2022 | Diehl et al. | |
| 2022/0159403 A1 | 5/2022 | Sporer et al. | |
| 2022/0223161 A1 | 7/2022 | Fuchs et al. | |
| 2022/0230048 A1 | 7/2022 | Li et al. | |
| 2022/0232321 A1 | 7/2022 | Wexler et al. | |
| 2022/0256294 A1 | 8/2022 | Diehl et al. | |
| 2023/0232169 A1 | 7/2023 | Casper et al. | |
| 2023/0232170 A1 | 7/2023 | Casper et al. | |
| 2023/0232171 A1 | 7/2023 | Casper et al. | |
| 2023/0232172 A1 | 7/2023 | Casper et al. | |
| 2023/0306982 A1 | 9/2023 | Lovchinsky et al. | |

FOREIGN PATENT DOCUMENTS

| | | |
|---|---|---|
| EP | 3836570 A1 | 6/2021 |
| WO | 2020/079485 A2 | 4/2020 |
| WO | WO 2020/152323 A1 | 7/2020 |
| WO | WO 2021/237368 A1 | 12/2021 |
| WO | 2022/079848 A1 | 4/2022 |
| WO | 2022/107393 A1 | 5/2022 |
| WO | 2022/191879 A1 | 9/2022 |
| WO | 2023/136835 A1 | 7/2023 |

OTHER PUBLICATIONS

International Search Report and Written Opinion mailed Jun. 16, 2022 in connection with International Application No. PCT/US2022/012567.

International Search Report and Written Opinion mailed Apr. 28, 2023 in connection with International Application No. PCT/US2023/010837.

Gerlach et al., A Survey on Application Specific Processor Architectures for Digital Hearing Aids. Journal of Signal Processing Systems. Mar. 20, 2021;94:1293-1308. https://link.springer.com/rticle/10.1007/s11265-021-01648-0 [last retrieved May 17, 2022].

Giri et al., Personalized Percepnet: Real-time, Low-complexity Target Voice Separation and Enhancement. Amazon Web Service, Jun. 8, 2021, arXiv preprint arXiv:2106.04129. 5 pages.

Extended European Search Report dated Feb. 1, 2024 in connection with European Application No. 23190434.3.

* cited by examiner

HEARING LOSS AMPLIFICATION THAT AMPLIFIES SPEECH AND NOISE SUBSIGNALS DIFFERENTLY

CROSS-REFERENCE TO RELATED APPLICATIONS

The present application is a continuation claiming the benefit under 35 U.S.C. § 120 of U.S. patent application Ser. No. 18/366,851 filed Aug. 8, 2023, and entitled "HEARING LOSS AMPLIFICATION THAT AMPLIFIES SPEECH AND NOISE SUBSIGNALS DIFFERENTLY," which is hereby incorporated herein by reference herein in its entirety.

U.S. patent application Ser. No. 18/366,851 claims the benefit under 35 U.S.C. § 119(e) of U.S. Provisional Patent Application Ser. No. 63/396,523, filed Aug. 9, 2022, and entitled "METHOD, APPARATUS AND SYSTEM FOR A HEARING AID WITH DIFFERENT FITTINGS FOR DIFFERENT SOUNDS," which is hereby incorporated by reference herein in its entirety.

FIELD

The present disclosure relates to hearing aids and fitting hearing aids.

BACKGROUND

Hearing aids provide amplified sounds to the wearer of the hearing aid. The hearing aid receives the sounds the wearer would typically hear in various environments. The received sounds are amplified and provided to the wearer.

SUMMARY

According to one aspect of the technology described herein, a method for fitting a hearing aid includes performing a hearing test on a wearer and/or determining wearer preferences for listening to speech and noise; generating, based on the hearing test and/or the wearer preferences for listening to speech, and using a speech fitting formula, a set of speech fitting curves; generating, based on the hearing test and/or the wearer preferences for listening to noise, and using a noise fitting formula, a set of noise fitting curves; and providing a hearing aid. The hearing aid includes neural network circuitry configured to implement a neural network trained to separate a speech subsignal and a noise subsignal from an input audio signal, and digital processing circuitry. The digital processing circuitry includes a speech wide dynamic range compression (WDRC) pipeline and a noise WDRC pipeline. The speech WDRC pipelines is configured to perform WDRC on the speech subsignal and includes a set of speech subsignal level estimation circuitry configured to determine levels of the speech subsignal and a set of speech subsignal amplification circuitry configured to apply the set of speech fitting curves to the speech subsignal based at least in part on the levels of the speech subsignal. The noise WDRC pipeline is configured to perform WDRC on the noise subsignal and includes a set of noise subsignal level estimation circuitry configured to determine levels of the noise subsignal and a set of noise subsignal amplification circuitry configured to apply the set of noise fitting curves to the noise subsignal based at least in part on the levels of the noise subsignal. The speech fitting formula is different from the noise fitting formula and the set of speech fitting curves is different from the set of noise fitting curves.

In some embodiments, at least one speech fitting curve of the set of speech fitting curves provides amplification but at least one noise fitting curve of the set of noise fitting curves does not provide amplification. In some embodiments, at least one speech fitting curve of the set of speech fitting curves provides more amplification than at least one noise fitting curve of the set of noise fitting curves. In some embodiments, at least one speech fitting curve of the set of speech fitting curves provides additional amplification within a specific frequency range above amplification provided by at least one noise fitting curve of the set of noise fitting curves, and the specific frequency range is between or equal to 500 Hz-4 kHz. In some embodiments, the at least one speech fitting curve and the at least one noise fitting curve are approximately the same outside of the specific frequency range. In some embodiments, at least one noise fitting curve of the set of speech fitting curves is more linear than at least one speech fitting curve of the set of speech fitting curves.

In some embodiments, the hearing aid further comprises memory storing the set of speech fitting curves and the set of noise fitting curves.

In some embodiments, the hearing aid is further configured to measure a real-time signal-to-noise ratio (SNR) and modify at least one speech fitting curve of the set of speech fitting curves and/or at least one noise fitting curve of the set of noise fitting curves based on the real-time SNR. In some embodiments, the hearing aid is configured, when modifying the at least one speech fitting curve and/or the at least one noise fitting curve based on the real-time SNR, to determine an SNR level that a wearer needs in order to understand speech, and based on the real-time SNR and the SNR level that the wearer needs in order to understand speech, add amplification to the at least speech fitting curve and/or subtract amplification from the at least one noise fitting curve. In some embodiments, the hearing aid is further configured to make the at least speech fitting curve equal to the at least one noise fitting curve when the real-time SNR is below a threshold.

In some embodiments, the hearing aid is further configured to determine whether to separate the input audio signal into the speech subsignal and the noise subsignal, and based on determining not to separate, select amplification to apply to the input audio signal, and apply the amplification to the input audio signal. In some embodiments, the hearing aid is configured, when selecting the amplification to apply to the input audio signal, to select the set of noise fitting curves when there is no speech and select the set of speech fitting curves when there is speech and a level of background noise is below a certain threshold.

In some embodiments, the speech subsignal is a first speech subsignal of multiple speech sub signals corresponding to different speakers, and the hearing aid is configured to separate, using the neural network circuitry, the input audio signal into the multiple speech sub signals and the noise subsignal, and apply the set of speech fitting curves to each of the multiple speech sub signals separately. In some embodiments, the hearing aid is configured to separate, using the neural network circuitry, the input audio signal into the speech subsignal, the noise subsignal, and an own-voice subsignal, and apply a set of own-voice fitting curves to the own-voice subsignal, where the set of own-voice fitting curves is different from the set of speech fitting curves. In some embodiments, at least one own-voice fitting curve of the set of own-voice fitting curves provides less amplification than at least one speech fitting curve of the set of speech fitting curves. In some embodiments, the at least one own-voice fitting curve provides less gains in a frequency range that is below 1000 Hz than the at least one speech fitting curve, provides negative gains in a frequency range that is below 1000 Hz, or the hearing aid is configured to high-pass filter the own-voice subsignal.

In some embodiments, determining the wearer preferences for listening to noise includes playing example noise audio tracks. In some embodiments, the method further includes asking about realism and/or naturalness of noise in the noise audio tracks. In some embodiments, determining the wearer preferences for listening to noise includes closing the wearer's eyes, playing noise audio tracks, and the wearer reporting from where they think the noise audio tracks were played. In some embodiments, the method further includes performing a noise tolerance test on the wearer, the noise tolerance test including a speech-in-noise test and/or measuring an acceptable noise level for the wearer, and where generating the set of speech fitting curves and the set of noise fitting curves is further based on the noise tolerance test.

According to one aspect of the technology described herein, a hearing aid includes neural network circuitry configured to implement a neural network trained to separate a speech subsignal and a noise subsignal from an input audio signal, and digital processing circuitry. The digital processing circuitry includes a speech wide dynamic range compression (WDRC) pipeline and a noise WDRC pipeline. The speech WDRC pipelines is configured to perform WDRC on the speech subsignal and includes a set of speech subsignal level estimation circuitry configured to determine levels of the speech subsignal and a set of speech subsignal amplification circuitry configured to apply a set of speech fitting curves to the speech subsignal based at least in part on the levels of the speech subsignal. The noise WDRC pipeline is configured to perform WDRC on the noise subsignal and includes a set of noise subsignal level estimation circuitry configured to determine levels of the noise subsignal and a set of noise subsignal amplification circuitry configured to apply a set of noise fitting curves to the noise subsignal based at least in part on the levels of the noise subsignal. The set of speech fitting curves is different from the set of noise fitting curves.

In some embodiments, at least one speech fitting curve of the set of speech fitting curves provides amplification but at least one noise fitting curve of the set of noise fitting curves does not provide amplification. In some embodiments, at least one speech fitting curve of the set of speech fitting curves provides more amplification than at least one noise fitting curve of the set of noise fitting curves. In some embodiments, at least one speech fitting curve of the set of speech fitting curves provides additional amplification within a specific frequency range above amplification provided by at least one noise fitting curve of the set of noise fitting curves, and the specific frequency range is between or equal to 500 Hz-4 kHz. In some embodiments, the at least one speech fitting curve and the at least one noise fitting curve are approximately the same outside of the specific frequency range. In some embodiments, at least one noise fitting curve of the set of speech fitting curves is more linear than at least one speech fitting curve of the set of speech fitting curves.

In some embodiments, the hearing aid further comprises memory storing the set of speech fitting curves and the set of noise fitting curves.

In some embodiments, the hearing aid is further configured to measure a real-time signal-to-noise ratio (SNR) and modify at least one speech fitting curve of the set of speech fitting curves and/or at least one noise fitting curve of the set of noise fitting curves based on the real-time SNR. In some embodiments, the hearing aid is configured, when modifying the at least one speech fitting curve and/or the at least one noise fitting curve based on the real-time SNR, to determine an SNR level that a wearer needs in order to understand speech, and based on the real-time SNR and the SNR level that the wearer needs in order to understand speech, add amplification to the at least speech fitting curve and/or subtract amplification from the at least one noise fitting curve. In some embodiments, the hearing aid is further configured to make the at least speech fitting curve equal to the at least one noise fitting curve when the real-time SNR is below a threshold.

In some embodiments, the hearing aid is further configured to determine whether to separate the input audio signal into the speech subsignal and the noise subsignal, and based on determining not to separate, select amplification to apply to the input audio signal, and apply the amplification to the input audio signal. In some embodiments, the hearing aid is configured, when selecting the amplification to apply to the input audio signal, to select the set of noise fitting curves when there is no speech and select the set of speech fitting curves when there is speech and a level of background noise is below a certain threshold.

In some embodiments, the speech subsignal is a first speech subsignal of multiple speech sub signals corresponding to different speakers, and the hearing aid is configured to separate, using the neural network circuitry, the input audio signal into the multiple speech sub signals and the noise subsignal, and apply the set of speech fitting curves to each of the multiple speech sub signals separately. In some embodiments, the hearing aid is configured to separate, using the neural network circuitry, the input audio signal into the speech subsignal, the noise subsignal, and an own-voice subsignal, and apply a set of own-voice fitting curves to the own-voice subsignal, where the set of own-voice fitting curves is different from the set of speech fitting curves. In some embodiments, at least one own-voice fitting curve of the set of own-voice fitting curves provides less amplification than at least one speech fitting curve of the set of speech fitting curves. In some embodiments, the at least one own-voice fitting curve provides negative gains in a frequency range that is below 1000 Hz, or the hearing aid is configured to high-pass filter the own-voice subsignal.

BRIEF DESCRIPTION OF DRAWINGS

Various aspects and embodiments of the disclosure will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
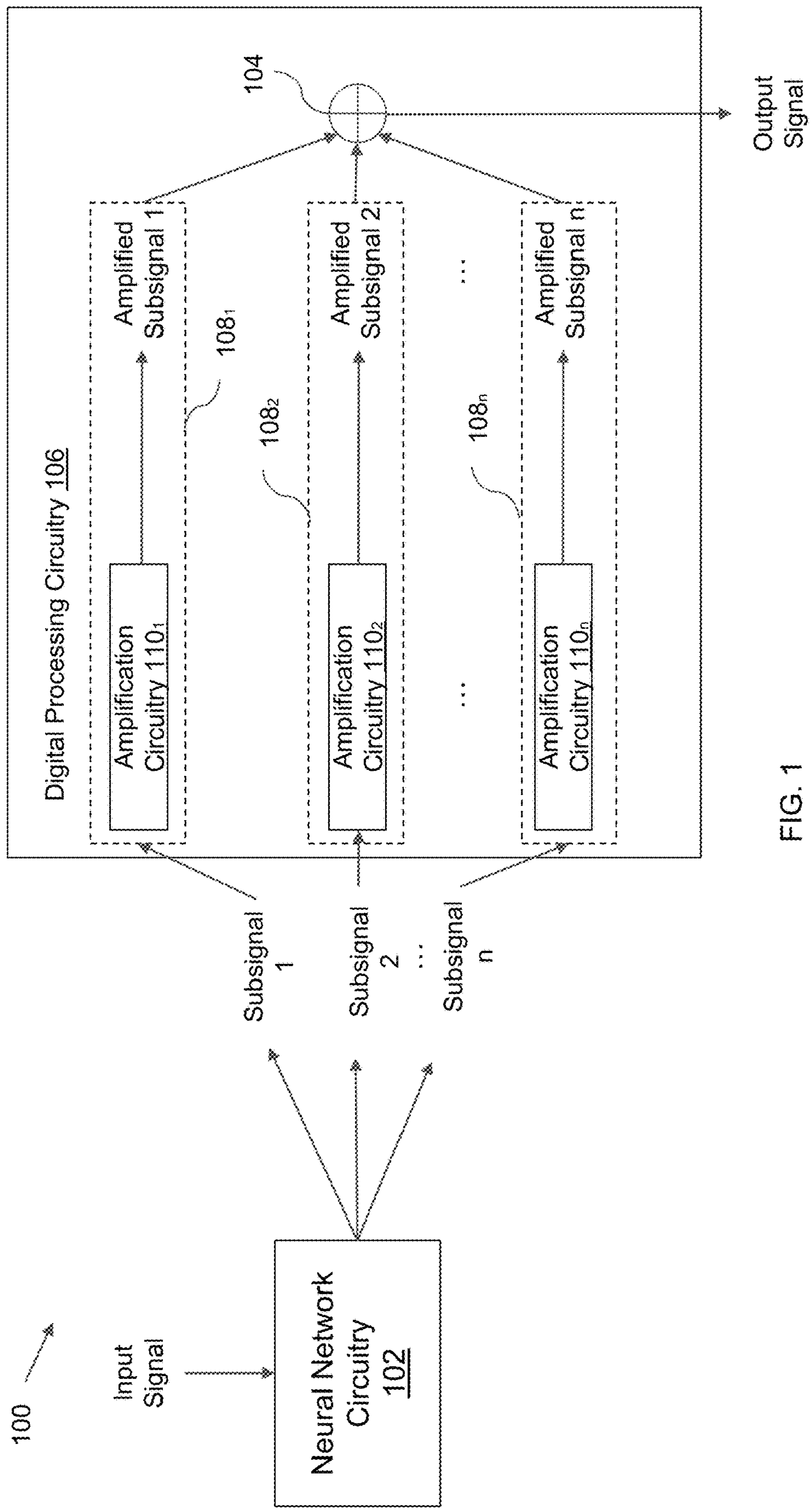
FIG. 1 illustrates a block diagram of an ear-worn device (e.g., a hearing aid), in accordance with certain embodiments described herein.

Some hearing aids apply a non-linear, frequency-dependent gain to the incoming sound so as to "fit" the output sound to the hearing profile of the wearer. For example, if a wearer has significant hearing loss in higher frequencies and much less hearing loss in lower frequencies, then, for the same input volumes, the hearing aid may apply more gain to higher frequency sounds than lower frequency sounds to equalize, in effect, the audibility or perceived loudness of different sounds across frequencies. Additionally, because those with hearing loss typically have a narrow range of volumes at which they can comfortably hear (a reduced "dynamic range"), some hearing aids apply more gain to quiet sounds and less gain to louder sounds, in effect "compressing" the original signal into the dynamic range of the wearer. These techniques are sometimes referred to as wide-dynamic range compression (WDRC).

Variations of traditional fitting techniques exist. Some algorithms use more or less compression. More compression fits more of the signal into the patient's usable acoustic range, but in doing so may introduce distortions into the sound (changing the shape of the envelope of the sound). Other algorithms do not use any compression. For example, the half-gain rule (a once-popular fitting technique) applies a consistent linear amplification constant by frequency (half the level of hearing loss). Adaptive wide-dynamic range compression changes the attack and release times based on the size of the change in volume. In some cases, the core technique involves dividing the incoming signal into different frequency ranges, typically called "channels," and then setting a gain for each channel as a function of the recent estimated level of the sound in that channel and the hearing loss of the individual (typically input as an audiogram).

For each frequency channel, every input level can be related to an output level according to some function. One can plot the input and their corresponding output levels to generate an input-output (I/O) curve, which is a typical visualization of the acoustic behavior for a given frequency channel. The slope of the I/O curve is related to the compression ratio. The I/O curve can typically be represented by a piecewise function. Technically, the I/O curve in a hearing aid can take any shape, but usually I/O curves are continuous so that there are never discontinuous changes in gain that would introduce distortion into the output. Most hearing aids are built in such a way that these I/O curves can be configured to best match a person's hearing loss. Certain parameters, like the number of frequency channels that the hearing aid is using for processing, may be fixed for all users of the device, while other parameters, like the shape of the frequency response across channels, or the amount of compression or the attack and release times in a given channel, may be configurable during a fitting. A user-specific configuration of settings that changes the sound of the hearing aid and persists through time may be considered "a fitting."

When a hearing aid is fit (adjusted to a person's hearing loss), typically either the hearing aid wearer or a hearing aid fitter will configure the device in such a way that manipulates the I/O curves for each frequency channel. Sometimes this can be done in an automated way where software can take in certain clinical inputs, like an audiogram or the results of a self-fitting hearing aid test, and generate a fitting. In other instances, a hearing aid fitter may manipulate elements of the configuration directly. Commonly, a fitter may directly manipulate the insertion gain that the device will apply for different input levels (typical is to specific gains for "quiet speech" (ie, 50 dB input level), "normal speech" (65 dB input level) and "loud speech" (80 dB input level)). Each of these in essence represents certain input points on the I/O curve for each frequency band, and then the fitting algorithm may use these points to determine gains for other input levels, for example by interpolating between these points on the I/O plot in some way.

The inventors have appreciated that traditional amplification algorithms are constrained by a fundamental limitation, which is that the amplification rules are applied to both the sounds the wearer wants to hear and those the wearer does not want to hear. Background noise can be particularly challenging to address. For example, fast-acting WDRC (quick attack and release times), which may help to emphasize quieter phonemes in speech, has the additional effect of amplifying quiet background noises more than the speech, which lowers the signal-to-noise ratio (SNR). Conversely, slow release times can mean that the speech following a loud noise can get less amplification than it otherwise should. The inventors have further appreciated that traditional fitting curves (which may also be referred to in terms of fitting formulas) were constrained by balancing multiple competing goals—maximizing speech intelligibility, improving the SNR, avoiding distortion and maintaining natural sounding ambience—all at once.

Aspects of the present disclosure provide a hearing system that fully separates the incoming audio signal into two or more separate audio subsignals, each corresponding to one or more sound sources, and then applies a different fitting curve to each of the separate audio subsignals. Unlike traditional techniques, the techniques of the present disclosure instead divide the signal based on semantic, high-level features like "speech" which are difficult to capture with heuristics (rather than dividing the signal only based on frequency). In certain embodiments, the gain applied to each of the subsignals is determined by a combination of characteristics of the subsignal itself and by characteristics of the other subsignal(s). The use of real-time source separation for hearing aids may facilitate such operation. For example, the neural network-based source separation technology described in U.S. Patent Publication No. 20230232169A1, (U.S. application Ser. No. 17/576,718), filed Jan. 14, 2022, published Jul. 20, 2023, and entitled "Method, Apparatus and System for Neural Network Hearing Aid" (the '169 publication) may be used for purposes of performing source separation. The '169 publication is incorporated by reference herein in its entirety.

In some embodiments, the incoming signal is divided into two separate audio subsignals using a neural network, for example in the manner described in the '169 publication. One of these subsignals may be speech, while the other may consist of all other sounds (which may be referred to as background noise or simply noise). Then two separate sets of frequency dependent gains may be set for each of the subsignals. Applying different fitting curves to speech and noise may be helpful because a wearer may have different goals when listening to speech and noise, and those goals may be best realized using different fitting curves for speech and noise sub signals. For example, the goal when listening to speech may be intelligibility, while the goal when listening to noise may be spatial awareness and comfort. Additionally, the system may apply a fitting curve to speech based on the input level of just the speech speech, and apply a fitting curve to noise based on the input level of just the noise. This may be helpful in avoiding pumping effects, in which changes of level in one subsignal (e.g., speech) may cause jumps in the amplification of another subsignal (e.g., noise) that is not changing in the same way.

The aspects and embodiments described above, as well as additional aspects and embodiments, are described further below. These aspects and/or embodiments may be used individually, all together, or in any combination of two or more, as the disclosure is not limited in this respect.

FIG. 1 illustrates a block diagram of an ear-worn device (e.g., a hearing aid) 100, in accordance with certain embodiments described herein. The ear-worn device 100 includes neural network circuitry 102 and digital processing circuitry 106. It should be appreciated that the ear-worn device 100 may include other elements not illustrated. The neural network circuitry 102 may be configured to implement a neural network (e.g., a recurrent neural network) trained to separate subsignals from an input audio signal. As an example, the subsignals may be a speech subsignal and a noise subsignal. As another example, the subsignals may be multiple speech subsignals (e.g., one subsignal per speaker) and a noise subsignal. As another example, the subsignals may be a speech subsignal, a noise subsignal, and an own-voice subsignal. In more detail, the recurrent neural network may be trained to convert the input audio signal into the frequency domain and predict one or more masks that may be applied to the input audio signal to separate it into subsignals. For example, a mask may be a complex mask, and to apply the mask to the input audio signal, the mask may be multiplied by the frequency-domain representation of the input audio signal to leave just one of the subsignals remaining. Separating subsignals from an input signal may include applying different masks to the input signal to result in separate subsignals; alternatively, separating subsignals from an input signal may include applying a mask to result in one subsignal, and subtracting that subsignal from the original signal to leave behind another subsignal.

The digital processing circuitry 106 includes multiple hearing loss amplification (which may be referred to herein simply as "amplification") pipelines 108. Each amplification pipeline 108 may correspond to one of the subsignals and include a block of amplification circuitry 110. The amplification circuitry 110 may be configured to implement hearing loss amplification, namely additional amplification configured to offset the loss of audibility due to hearing loss. In particular, each respective block of amplification circuitry 210 may be configured to apply amplification to the respective input subsignal to produce an amplified subsignal. The amplification applied by each block of amplification circuitry 210 may be different. Thus, the amplification circuitry 1101 in the amplification pipeline 1081 may be configured to apply a first amplification to subsignal 1, the amplification circuitry 1102 in the amplification pipeline 1082 may be configured to apply a second amplification to subsignal 2, etc., and the first and second amplifications may be different. Generally, amplification may be any method for amplifying signals to offset loss of audibility due to hearing loss, and may include, for example, one or more rules, formulas, or curves. It should be appreciated that the amplification pipelines 108 do not include level estimation circuitry (in contrast to the amplification pipelines 208 and 308 of FIGS. 2 and 3, respectively) and thus the amplification implemented by the amplification circuitry 110 may not be applied as a function of input level. In other words, the amplification may be independent of input level. As an example, the amplification applied by the amplification circuitry 110 may include the half-gain rule (adding gain equal to approximately half the amount of hearing loss) or the quarter-gain rule (adding gain equal to half the total hearing loss, plus one quarter of the conductive loss component of the hearing loss). In some embodiments, the digital processing circuitry 106 may consider different channels (i.e., groups) of frequencies of the subsignals separately, and the amplification applied by the amplification circuitry 110 may be frequency-dependent; in other words, the amount of gain applied may be different for different frequency channels. The combiner 104 (e.g., a summer) may be configured to combine the amplified subsignals back into a single output signal. By employing this technique of applying different amplification blocks for different sub signals, the sub signals may receive different frequency shaping.

It should be appreciated that while FIG. 1 illustrates more than two subsignals, more than two amplification pipelines 108, and more than two amplified subsignals, in some embodiments there may be two subsignals, two amplification pipelines 108, and two amplified subsignals (e.g., one each for speech and for noise).

Figure 2:
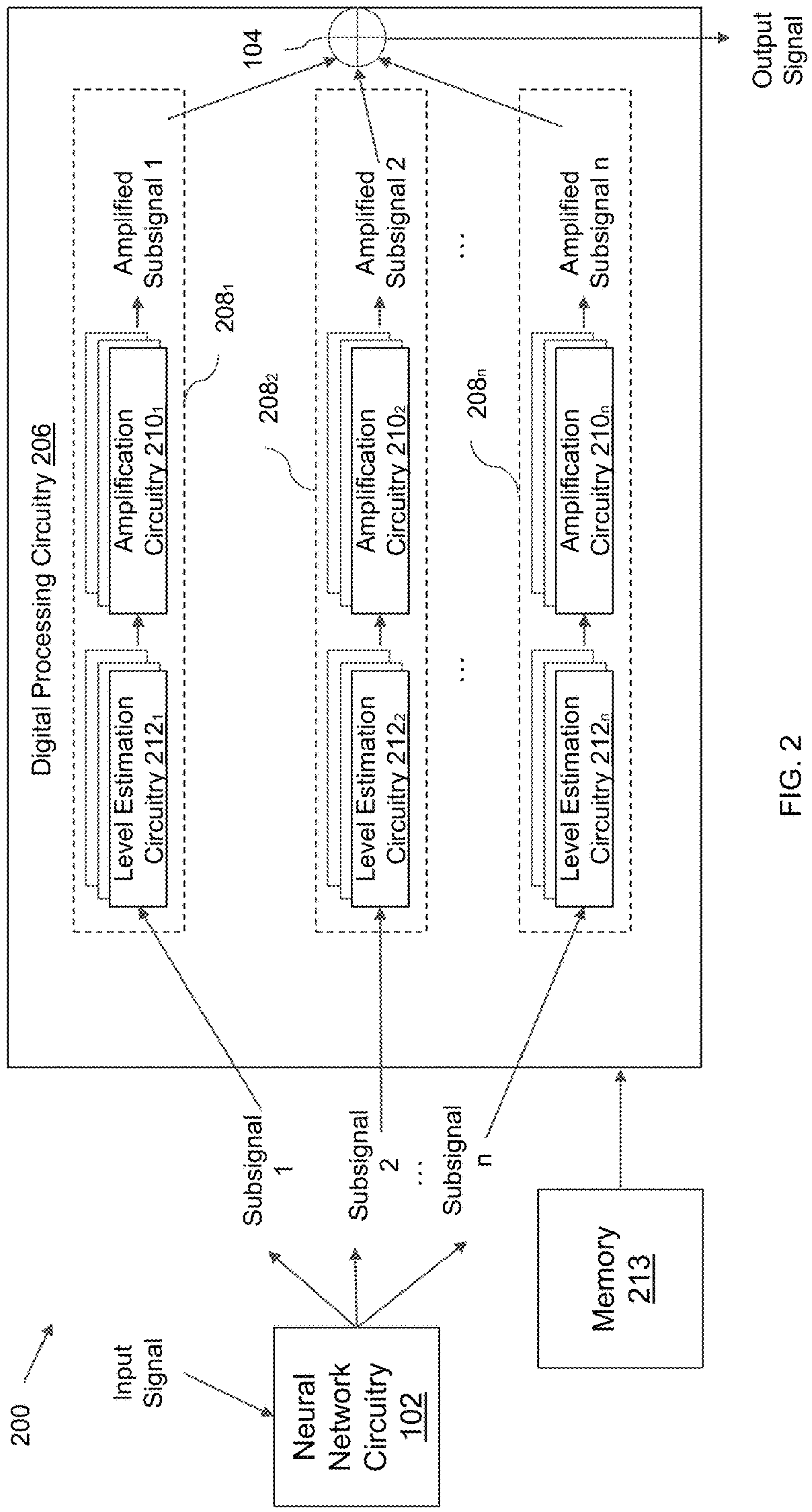
FIG. 2 illustrates a block diagram of an ear-worn device (e.g., a hearing aid) in accordance with certain embodiments described herein.

FIG. 2 illustrates a block diagram of an ear-worn device (e.g., a hearing aid) 200, in accordance with certain embodiments described herein. The ear-worn device 200 is the same as the ear-worn device 100 except that the ear-worn device 200 includes digital processing circuitry 206 and memory 213. The digital processing circuitry 206 includes the amplification pipelines 208, one for each subsignal, and each including a set of level estimation circuitry 212 and a set of amplification circuitry 210. Each set of level estimation circuitry 212 is displayed as including multiple blocks, each block for a different frequency channel. Each set of amplification circuitry 210 is displayed as including multiple blocks, each block for a different frequency channel. (Circuitry for converting input signals to the frequency domain, splitting the signals into frequency channels, combining the frequency channels together, and converting to the time domain, is not shown for simplicity).

Each respective set of level estimation circuitry 212 may be configured to determine levels of a respective subsignal, and each respective set of amplification circuitry 210 may be configured to amplify (e.g., apply a set of speech fitting curves) to the respective subsignal based at least in part on the levels of the speech subsignal as determined by the level estimation circuitry 212. In more detail, for a particular subsignal's respective set of level estimation circuitry 212, each block of the level estimation circuitry 212 may be configured to determine a level (e.g., a power or an amplitude) of the input subsignal within a particular frequency channel and within some time window or over some moving average of time windows. For a particular subsignal's respective set of amplification circuitry 210, each block of the amplification circuitry 210 may be configured to apply amplification to the input subsignal within a particular frequency channel, such that the result is an amplified subsignal within that frequency channel, and the sum total of the amplified subsignal within the different frequency channels is an amplified subsignal. The amplification applied by each amplification pipeline 208's set of amplification circuitry 210 may be different. The amplification applied by the amplification circuitry 210 to a particular frequency channel of a subsignal may depend, at least in part, on the input level of that particular frequency channel of the subsignal as determined by the level estimation circuitry 212. Amplification that is input level-dependent and frequency-dependent may include applying a set of fitting curves to the subsignal, each fitting curve being an output level vs. input level curve for a given frequency channel (or, equivalently, each fitting curve being an output level vs. frequency channel curve for a given input level). Different amplification may include different sets of fitting curves. Applying a set of fitting curves to a subsignal may include determining the input level of the subsignal in each frequency channel, determining from one of the fitting curves the output level that corresponds to that input level and frequency channel, amplifying that channel of the subsignal to that output level, and combining results from the different frequency channels.

Thus, the level estimation circuitry 2121 in the amplification pipeline 1081 may be configured to determine a level of subsignal 1 in each frequency channel, and the amplification circuitry 1101 may be configured to apply a first amplification to subsignal 1 based on a first set of fitting curves defining output level as a function of input level and frequency channel. The level estimation circuitry 2122 in the amplification pipeline 1082 may be configured to determine a level of subsignal 2 in each frequency channel, and the amplification circuitry 1102 may be configured to apply a second amplification to subsignal 2 based on a second set of fitting curves defining output level as a function of input level and frequency channel. The first and second amplification may be different; in other words, the first and second set of fitting curves may be different.

It should be appreciated that the digital processing circuitry 206 includes different level estimation circuitry 212 and different amplification circuitry 210 for different sub signals. One subsignal may have blocks of level estimation circuitry 212 and blocks of amplification circuitry 210, each block for a particular frequency channel, and another subsignal may have separate blocks of level estimation circuitry 212 and blocks of amplification circuitry 210 for the same frequency channels. Thus, each amplification pipeline 208 may be configured to measure input levels for different sub signals separately. This may be helpful in avoiding pumping effects, in which, due to using only a single level estimator for the entire signal, changes of level in one subsignal may cause jumps in the amplification of another subsignal that is not changing in the same way.

It should also be appreciated that while FIG. 2 illustrates more than two subsignals, more than two amplification pipelines 208, and more than two amplified subsignals, in some embodiments there may be two subsignals, two amplification pipelines 208, and two amplified subsignals (e.g., one for speech and one for noise).

The memory 213 may store the different sets of fitting curves for the different sub signals. For example, the memory may store one set of fitting curves for speech and one set of fitting curves for noise. In some embodiments, a fitting curve for a particular subsignal and a particular frequency channel may be stored as a set of input levels each with an associated output level, thereby defining a piecewise curve.

Figure 3:
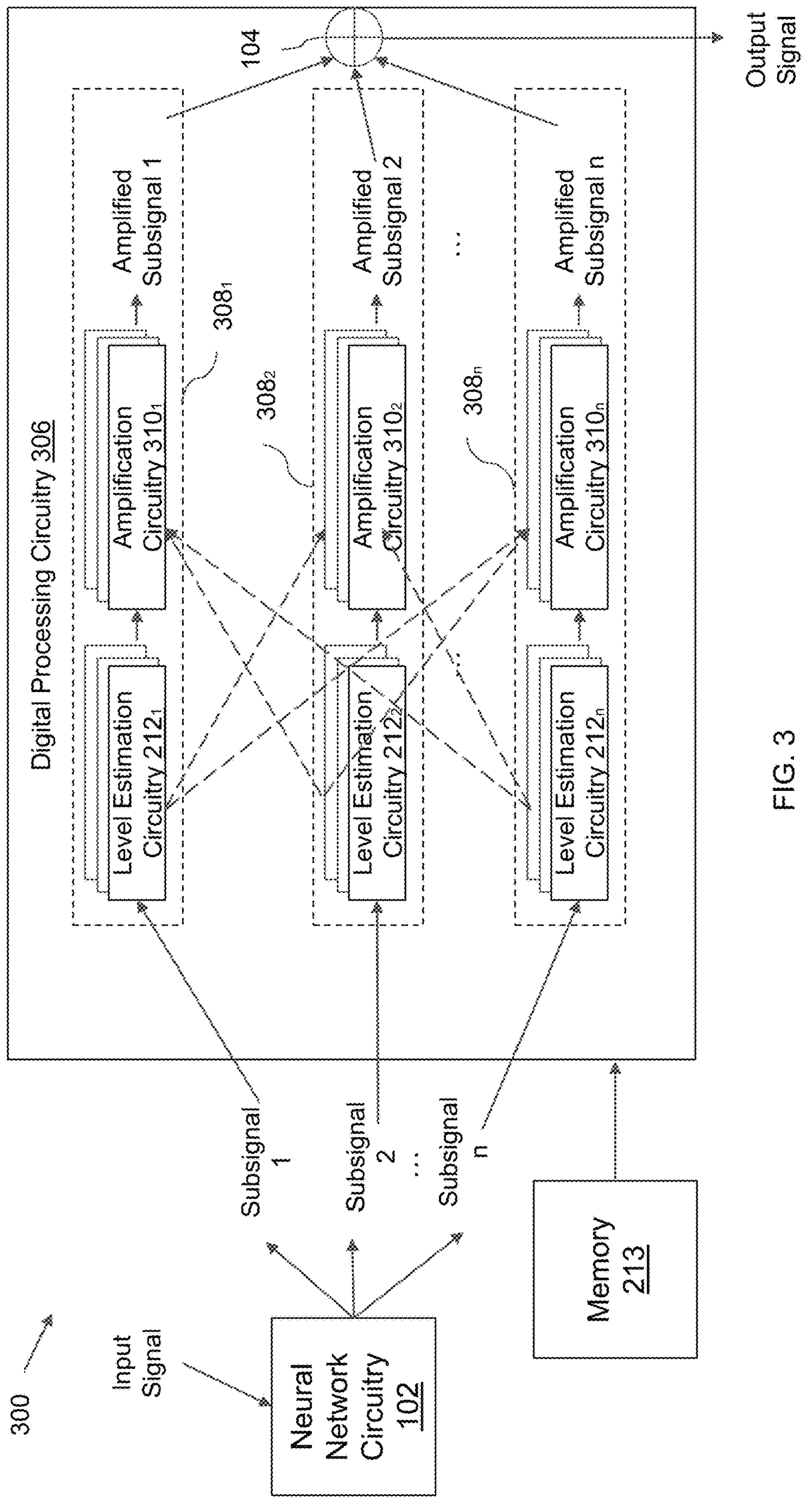
FIG. 3 illustrates a block diagram of an ear-worn device (e.g., a hearing aid), in accordance with certain embodiments described herein.

FIG. 3 illustrates a block diagram of an ear-worn device (e.g., a hearing aid) 300, in accordance with certain embodiments described herein. The ear-worn device 300 is the same as the ear-worn device 200, except that the ear-worn device 300 includes digital processing circuitry 306. The digital processing circuitry 306 includes the amplification pipelines 308, each including level estimation circuitry 212 and amplification circuitry 310. The amplification pipelines 308 are the same as the amplification pipelines 208, except that one amplification pipeline 308 may perform amplification based on the level of its own associated subsignal as well as the level of one or more other subsignals. For example, if one subsignal is a speech signal and one subsignal is a noise signal, the levels of the speech and noise subsignals may be used to calculate signal-to-noise ratio (SNR) which may then be used to modify the speech and/or noise fitting curves, as will be described further below. In an alternative embodiment, you might only use the level of the speech signal to set the gains for both the speech and noise sub signals.

It should be appreciated that while FIG. 3 illustrates more than two subsignals, more than two amplification pipelines 308, and more than two amplified subsignals, in some embodiments there may be two subsignals, two amplification pipelines 308, and two amplified subsignals (e.g., one for speech and one for noise).

It should also be appreciated that level-dependent amplification may be configured to implement compression, in which the dynamic range of the output level is smaller than the dynamic range of the input level. Amplification that includes compression may be referred to as wide-dynamic range compression (WDRC). Thus, FIGS. 2 and 3 may illustrate hearing aids having multiple WDRC pipelines (i.e., the amplification pipelines 208, 308). A WDRC pipeline configured to perform WDRC on a speech subsignal may be referred to as a speech WDRC pipeline and include speech subsignal level estimation circuitry and speech subsignal amplification circuitry. The speech subsignal amplification circuitry may be configured to apply a set of speech fitting curves to the speech subsignal based, at least in part, on the frequency-dependent level of the speech subsignal as determined by the speech subsignal level estimation circuitry, and these fitting curves may apply compression. A WDRC pipeline configured to perform WDRC on a noise subsignal may be referred to as a noise subsignal WDRC pipeline and include noise subsignal level estimation circuitry and noise subsignal amplification circuitry. The noise subsignal amplification circuitry may be configured to apply a set of noise fitting curves to the noise subsignal based, at least in part, on the frequency-dependent levels of the noise subsignal as determined by the noise subsignal level estimation circuitry, and these fitting curves may apply compression. The set of speech fitting curves and the set of noise fitting curves may be different. In some embodiments, the set of frequency channels used for amplifying the speech subsignal may be different from the set of frequency channels used for amplifying the noise subsignal. It should be appreciated that amplification pipelines capable of performing compression may still be referred to as WDRC pipelines even if every fitting curve applied by the pipeline does not necessarily include compression.

As described above, in some embodiments the amplification applied to different subsignals may be different. For example, a fitting curve applied to a speech subsignal may be different than a fitting curve applied to a noise subsignal. It should be appreciated that, in some embodiments, the different fitting curves do not represent mere denoising. Consider a speech fitting curve to be represented by a function $F_s$ such that $S_{f,i}=F_s(X_{f,i})$, where $X_{f,i}$ is the input level and $S_{f,i}$ is the output level for a particular frequency f and a particular time sample i. Consider a noise fitting curve to be represented by a function $F_n$ such that $N_{f,i}=F_n(X_{f,i})$, where $X_{f,i}$ is the input level and $S_{f,i}$ is the output level. Mere denoising performed before amplification could be represented as $N_{f,i}=F_s(X_{f,i}-c)$. Mere denoising performed after amplification could be represented as $N_{f,i}=F_s(X_{f,i})-c$. However, in some embodiments of the technology described herein, the different fitting curves applied to the speech and noise subsignals do not have these relationships. In other words, $N_{f,i}\neq F_s(X_{f,i}-c)$ and $N_{f,i}:\neq F_s(X_{f,i})-c$. In still other words, the set of output level vs. input level fitting curves applied to the noise subsignal may not be merely translations along the x- or y-axis of the set of output level vs. input level fitting curves applied to the speech subsignal.

In some embodiments, the level estimation circuitry 212 may be configured to calculate an exponential moving average (also known as a one-pole IIR filter) of the level (e.g., the power or amplitude) of the subsignal for each frequency channel of the subsignal. Let $\underline{x}$ be the latest estimate of the average, and x be the latest sample. Generally, the new average may be calculated as $k\,\underline{x}+(1-k)|x|$, where k is a coefficient and |x| is the complex magnitude of |x| (i.e., a measure of how "strong" x is). The value of k may be different depending on whether the subsignal is increasing or decreasing. It may be helpful for the average to respond quickly when someone starts talking ("fast attack") and for the average to ease up slowly when someone finishes talking ("slow decay") to reduce artifacts. Thus, if $x>\underline{x}$ (signal increasing), then the new average may be calculated as $a\,\underline{x}+(1-a)|x|$; if $x<\underline{x}$ (signal decreasing), then the new average may be calculated as $b\,\underline{x}+(1-b)|x|$; and $a<b$ so that the new average contains more of the current sample for increasing signals than for decreasing samples. The new average may be considered the current level of the subsignal for that frequency channel. It should be appreciated that other methods for determining level may be used instead.

In some embodiments, the amplification circuitry 210 and/or 310 may be configured to interpolate the current level into a fitting curve. If the fitting curve is an output level vs. input level curve, the curve may be represented as a set of input levels each with an associated output level, thereby defining a piecewise curve. First, the amplification circuitry may determine that the current input level falls between a specific two input levels on the fitting curve. The amplification circuitry may interpolate the current input level into a line between the two input levels on the curve and thereby find the output level for the current input level. Other methods may be used instead, such as a pre-computed lookup table of gains for a finely sampled sequence of levels, or some other analytic function with parameters tuned to obtain the desired gain curve vs input level.

It should be appreciated that when separating the input audio signal into a speech subsignal and a noise subsignal, the digital signal processing 106, 206, and/or 306 may be configured to attenuate the noise subsignal and add it back to the speech subsignal using the combiner 104, or eliminate the noise subsignal completely, in order to perform denoising or noise reduction.

In some embodiments, the fitting curves applied to different sub signals (e.g., speech and noise) may be the same. Nevertheless, when the amplification is level- and frequency-dependent, the amplification applied to the different sub signals may be different even though the fitting curves may be the same, because the different sub signals may have different frequency-dependent input levels. In other words, once sub signals are separated from each other and subjected to separate amplification pipelines, the amplification applied to the different sub signals may be different even if the fitting curves used for the different sub signals are the same. For example, even if fitting curves are the same for speech and noise, as the input level of a speech subsignal increases, the amplification applied to the speech subsignal may change; however, if the input level of the noise subsignal does not change, the amplification applied to the noise subsignal may not change.

Figure 4:
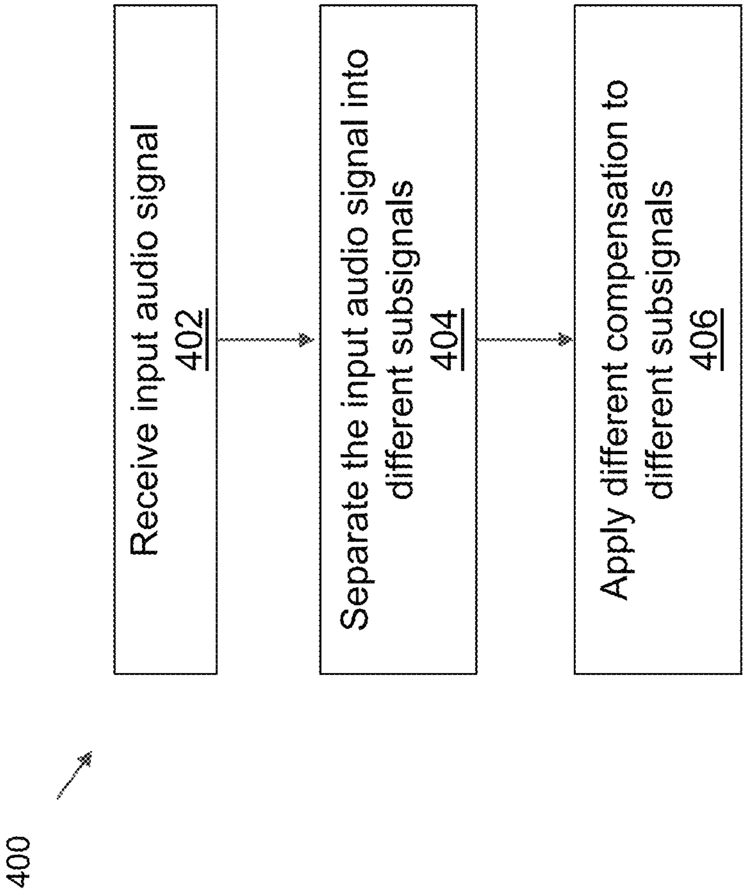
FIG. 4 illustrates a process for separation and amplification of audio signals, in accordance with certain embodiments described herein.

FIG. 4 illustrates a process 400 for separation and amplification of audio signals, in accordance with certain embodiments described herein. A hearing aid (e.g., the ear-worn devices 100, 200, and/or 300) may be configured to perform the process 400.

At step 402, the hearing aid receives an input audio signal. For example, the input audio signal may be received by microphones on the hearing aid. It should be appreciated that the audio signal received at step 402 may be processed by the hearing aid. For example, analog processing (e.g., pre-amplification, filtering) may be performed, analog-to-digital conversion may be performed, and digital processing (e.g., beamforming, anti-feedback, wind reduction) may be performed.

At step 404, the hearing aid separates the input audio signal into different subsignals. For example, the multiple subsignals may be a speech subsignal and a noise subsignal. As another example, the multiple subsignals may be multiple speech subsignals (e.g., one subsignal per speaker) and a noise subsignal. As another example, the multiple subsignals may be a speech subsignal, a noise subsignal, and an own-voice subsignal. The hearing aid may use a neural network (e.g., implemented by the neural network circuitry 102) to perform the source separation. The neural network may be, for example, a recurrent neural network. The recurrent neural network may be trained to convert the input signal into the frequency domain and predict one or more masks that may be applied to the input audio signal to separate it into subsignals. For example, a mask may be a complex mask, and to apply the mask to the input audio signal, the mask may be multiplied by the frequency-domain representation of the input audio signal to leave just one of the subsignals remaining. Applying different masks may result in separation of the different sub signals; alternatively, one separated subsignal may be subtracted from the original signal to leave behind another subsignal.

At step 406, the hearing aid applies different amplification (in particular, different hearing loss amplification) to the different subsignals. Generally, amplification may be any method for amplifying signals to offset loss of audibility due to hearing loss, and may include one or more rules, formulas, or curves. For example, amplification that is input level-dependent and frequency-dependent may include multiple curves (which may be referred to as fitting curves), each fitting curve being an output level vs. input level curve for a given frequency channel (or, equivalently, each fitting curve being an output level vs. frequency channel curve for a given input level). Fitting curves may thus generally dictate how much to amplify different frequency channels of a given subsignal as a function of channel and input level. Applying a fitting curve to a subsignal may include splitting the subsignal into frequency channels, determining an input level of the subsignal in that frequency channel, using a fitting curve from the set of curves to determine how much amplification to apply to this frequency channel of the subsignal using a fitting curve, and combining the results from the different frequency channels. The different amplification applied at step 406 may include applying one set of fitting curves to one of the subsignals and a different set fitting of curves to another of the subsignals. Thus, if the two subsignals are a speech subsignal and a noise subsignal, the hearing aid may apply a set of speech fitting curves to the speech subsignal and apply a set of noise fitting curves to the noise subsignal, where the set of speech fitting curves and the set of noise fitting curves are different. The hearing aid may then combine (e.g., add) the results from the different sub signals.

Figure 5:
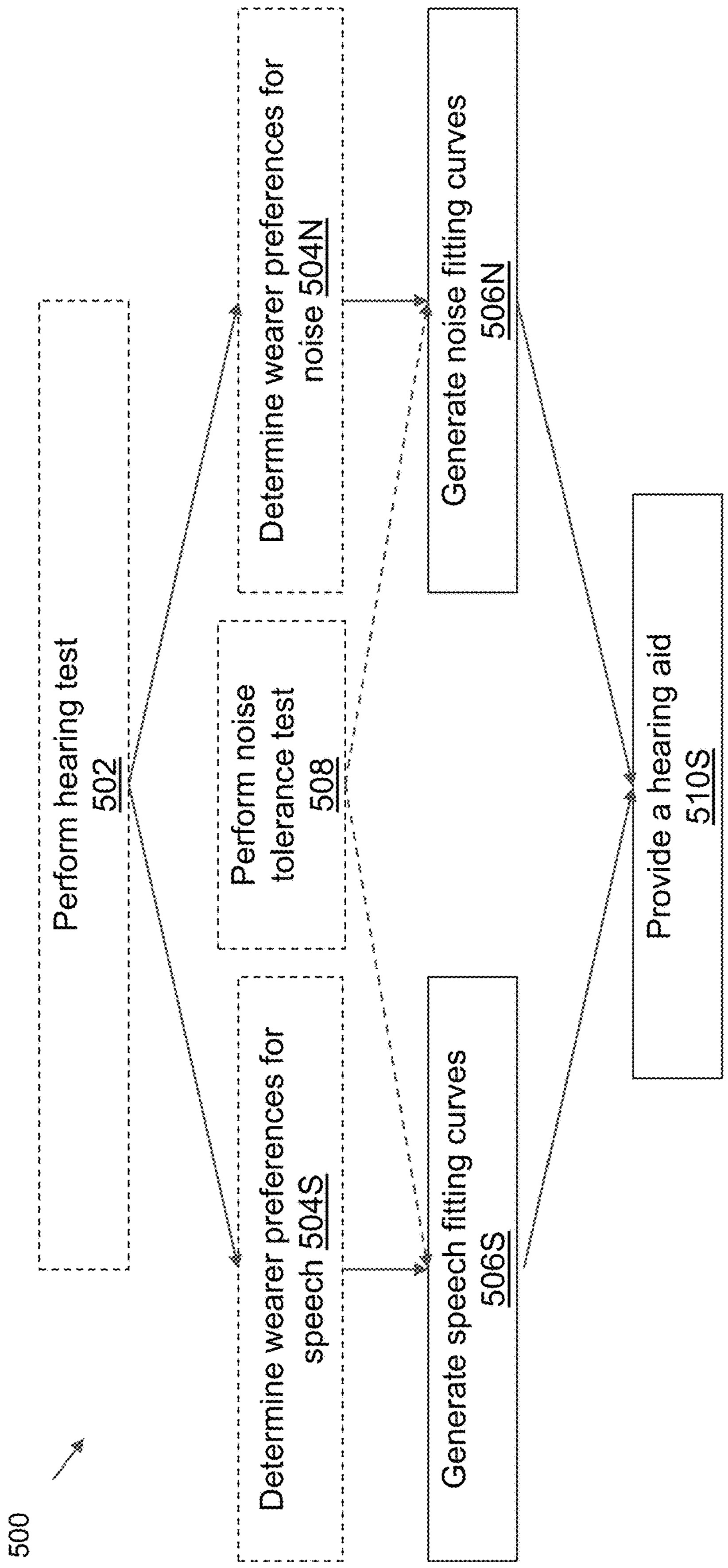
FIG. 5 illustrates a process for fitting a hearing aid to a wearer, in accordance with certain embodiments described herein.

FIG. 5 illustrates a process 500 for fitting a hearing aid (e.g., the ear-worn devices 100, 200, and/or 300) to a wearer, in accordance with certain embodiments described herein. The process 500 may be performed, for example, by a fitter such as an audiologist or other hearing care professional, or by the hearing aid wearer themselves, or by a customer support representative. The process 500 may include using a processing device such as a phone, tablet, or computer for certain steps. The process 500 may be performed while the wearer is wearing the hearing aid, and the fitter may modify fitting curves of the hearing aid during the process 500. The different amplification for the different subsignals may be the hearing loss amplification applied at step 406 of the process 400, and may be applied by the amplification pipelines 108, 208, and/or 308.

At step 502, a hearing test is performed on the wearer. The hearing test may involve measuring clinical patient-specific data, such as hearing thresholds and/or uncomfortable loudness levels (UCLs), and may include generating an audiogram. It should be appreciated that a wearer may perform the hearing test on themselves, for example using a program on their phone or tablet.

The inventors have realized that, premised upon the separation of speech and noise, further modifications may be made to a conventional fitting formula to further improve intelligibility and comfort for the wearer relative to conventional fitting approaches. The fitting process may collect further information about wearer capabilities and preferences (generally referred to herein as "wearer preferences") for listening to each of speech and noise which may be used to create different fitting curves for different types of sounds. Thus, the example process 500 includes a step 504S for determining wearer preferences for speech and a step 504N for determining wearer preferences for noise. Based at least in part on the wearer preferences for speech determined at step 504S, speech fitting curves may be generated at step 506S. Based at least in part on the wearer preferences for noise determined at step 504N, noise fitting curves may be generated at step 506S. The process of determining wearer preferences for speech and generating speech fitting curves based on those preferences may be referred to as a speech fine-tuning process. The process of determining wearer preferences for noise and generating noise fitting curves based on those preferences may be referred to as a noise fine-tuning process. The speech fine-tuning process and the noise fine-tuning process may be different.

At step 504S, for example, the fitter (e.g., an audiologist or other hearing care professional, or the wearer themselves, or a customer support representative) may talk to the wearer and/or play audio containing speech and ask about the naturalness and/or clarity of the speech. The speech may include exemplary speech sentences with different frequency emphases to learn how the wearer likes to hear speech. Based on the wearer's responses, the audiologist may modulate the speech fitting curves generated at step 506S to optimize for naturalness and clarity and speech.

At step 504N, for example, the fitter may play multiple example noise audio tracks, where the different tracks may be at different volumes and/or include different frequency content. The fitter may ask about the realism and/or naturalness of the noise in the noise audio tracks. Whereas the goals for the speech tuning at step 504S may be to optimize for the naturalness and clarity of the speech, for the noise, the goal might instead be to optimize for spatial awareness and comfort. For spatial awareness, the wearer may close their eyes, the fitter may play noises at different volumes, and the wearer may report on where they think the noises are coming from. The goal may be to modulate the noise fitting curves generated at step 506N such that the wearer can correctly orient themselves in space and identify what is going on in their environment. The noise fine-tuning may additionally or alternatively include testing to determine at which volumes the person finds background noise annoying. This testing may be done in the presence of speech or when no speech is present.

The fitting curves generated at steps 506S and 506N may be specific to the wearer's hearing loss, and may be based at least in part on data collected during the hearing test at step 502. In some embodiments, generating the fitting curves at step 506S and 506N may include using a conventional fitting formula to generate fitting curves that, in conventional systems, are applied to the entire audio signal; such curves will be referred to herein as "generic curves." In embodiments that include fine-tuning, step 506S may begin with these generic fitting curves and fine-tune them to generate the fitting curves specific for speech and/or step 506N may begin with these generic fitting curves and fine-tune them to generate the fitting curves specific for noise. One example algorithm for generating a generic fitting curve is provided below.

First, generate the target insertion gains for each frequency band for the levels of a 65 dB speech input according to a formula that relates the level of hearing loss on the audiogram to the target insertion gain. The formula for each band may be a linear formula (IG=m*HL+b) wherein IG is insertion gain, HL is the level of Hearing Loss on the audiogram, and m (the coefficient between hearing loss and insertion gain) is some number between 0 and 1, and b is some number of dB. The coefficients m and b may be set differently for each frequency band. In some embodiments, the gains are floored at zero. In some embodiments the gains may be non-linear or some other piecewise formula, for example increasing m at higher levels of hearing loss.

Second, use the patient's estimated UCL (Uncomfortable Loudness Level), either measured or predicted, in combination with the 65 input level insertion gains derived above, and use them to compute a compression ratio such that the gains decrease to zero insertion gain by the UCLs.

Third, the fitting formula may use the derived Compression Ratio to calculate gains for other input levels for each band. Many times, there will often be a kneepoint below the 65 dB input level where the gains return to linear (for example, for gains below 50 dB speech input level) and even a region below which the compression ratio is less than 1 (i.e., there is expansion). Sometimes, device-specific considerations may be included to modify the insertion gain targets. For example, estimated or measured feedback thresholds may be used to put a cap on gain targets so as to prevent feedback for the wearer.

It should be appreciated that other fitting formulas may be used, ranging from the simple "half-gain rule" to the more complex NAL-NL2 formula.

In some embodiments, generating the fitting curves at step 506S may include using a speech fitting formula. The speech fitting formula may be a formula that generates fitting curves optimized for amplifying speech, and may be based at least in part on data collected during the hearing test at step 502. In some embodiments, generating the fitting curves at step 506N may include using a noise fitting that generates noise curves optimized for amplifying noise, and may be based at least in part on data collected during the hearing test at step 502. The speech fitting curves and the noise fitting curves may be different. The speech fitting formula and the noise fitting formula may be different. The speech and noise fitting curves may be fine-tuned based on the wearer preferences determined at step 504S and/or the wearer preferences determined at step 504N. Thus, in such embodiments, the speech fitting curves may be fine-tuned starting from fitting curves already optimized specifically for speech, and the noise fitting curves may be fine-tuned starting from fitting curves already optimized specifically for noise. In contrast, in embodiments such as those described above, the speech and noise fitting curves may be fine-tuned starting from generic fitting curves not necessarily optimized for speech, or noise, or either. In other words, in some embodiments the results of the hearing test may be fed into a conventional fitting formula initially, while in other embodiments the results of the hearing test may be fed into speech and noise fitting formulas initially. Fine-tuned fitting curves may be referred to herein simply as fitting curves. FIGS. 6-12 and the associated description describe and illustrate different characteristics of speech and noise fitting curves that may be generated using some combination of conventional fitting formulas, speech and noise fitting formulas, and/or speech and noise fine-tuning at steps 506S and 506N.

At step 508, a noise tolerance test is performed on the wearer. In some embodiments, the noise tolerance test may be incorporated into the hearing test performed at step 502. In some embodiments, the noise tolerance test may include speech-in-noise testing, which may measure the wearer's ability to understand speech in background noise. In some embodiments, the noise tolerance test may include measuring the acceptable noise level, which may measure the volume at which the wearer finds background noise disturbing. In some embodiments, both speech-in-noise tests and acceptable noise level measurement may be performed. In some embodiments, establishing the acceptable level of noise may be done through fine tuning where the wearer is able to adjust the amplification level applied to the speech and noise while listening to speech in the presence of noise.

The results of the noise tolerance test from step 508 may be used in SNR (signal-to-noise ratio)-based tuning of the speech and noise fitting curves during the fitting curve generation at steps 506S and 506N. In some embodiments, the SNR-based tuning may include determining how much denoising should be targeted, for example by a neural network (e.g., implemented by the neural network circuitry 102) configured to denoise audio signals. As an example, the target SNR may be based on the SNR at which the wearer was able to understand speech in a speech-in-noise test. As another example, the target SNR may be based on the measured acceptable noise level.

In some embodiments, the speech and/or noise fitting curves may be generated to ensure a minimum SNR is achieved in each frequency band. This may help to ensure that all speech components are audible and not masked by noise in that frequency or lower frequencies. (This latter phenomenon is called the "spread of upward masking"). For example, if there is steady-state noise centered at 1000 Hz, and the hearing aid tips are minimally occlusive at that frequency, the speech fitting curves might be generated to provide extra boost either in that frequency band or to the overall speech signal to ensure that the SNR in that frequency remains good.

In some embodiments, the speech fitting curves may be generated to target higher SNR in frequency bands where the wearer has worse hearing. For example, if the wearer has severe hearing loss above 3000 Hz, it may be helpful never to output a noise signal above 3000 Hz. Instead, the speech and/or noise fitting curves may be generated to maximize the SNR in that band so that the wearer can hear consonants, whereas in lower frequency bands noise may still be outputted, which may be helpful for situational awareness, masking distortions, etc.

In some embodiments, if one frequency band requires additional amplification to get to the target SNR in that band, the speech fitting curves may be generated to apply that additional amplification to the whole speech signal rather than just that frequency band, such that the shape of the speech signal is not changed.

It should be appreciated that the direct path (i.e., the original sound signal reaching the eardrum) may be taken into account when calculating the SNR in each frequency band.

FIG. 5 illustrates step 502 as optional. For example, in some embodiments, fitting curves may be generated (at steps 506S and 506N) just based on wearer preferences (e.g., determined at steps 504S and/or 504N) and/or a noise tolerance test (e.g., performed at step 508), and not based on a hearing test. A hearing test may not be performed, for example, when the wearer obtains an over-the-counter hearing aid. In such embodiments, the fitting curves may begin with predetermined fitting curves based on clinical data representative of a category of people with hearing loss.

FIG. 5 also illustrates steps 504S and 504N as optional. For example, in some embodiments, fitting curves may be generated (at steps 506S and 506N) just based on a hearing test (e.g., performed at step 502) and/or a noise tolerance test (e.g., performed at step 508), and not based on wearer preferences.

FIG. 5 also illustrates step 508 as optional. For example, in some embodiments, fitting curves may be generated (at steps 506S and 506N) just based on a hearing test (e.g., performed at step 502) and/or wearer preferences (e.g., determined at steps 504S and/or 504N), and not based on a noise tolerance test.

In other words, in some embodiments, the process 500 may include performing a hearing test and/or determining wearer preferences for speech and noise. In some embodiments, the process 500 may include performing a hearing test and/or performing a noise tolerance test. In some embodiments, the process 500 may include determining wearer preferences for speech and noise and/or performing a noise tolerance test. In some embodiments, the process 500 may include performing a hearing test, determining wearer preferences for speech and noise, and/or performing a noise tolerance test (i.e., any subset of these three steps).

Thus, some non-limiting embodiments of a fitting process may include one of the following non-limiting examples:

1. Performing a hearing test, determining wearer preferences for speech and noise, and generating fine-tuned speech and noise fitting curves based on the results of the hearing test, a conventional fitting formula, and the wearer preferences for speech and noise.

2. Performing a hearing test, determining wearer preferences for speech and noise, and generating fine-tuned speech and noise fitting curves based on the results of the hearing test, speech and noise fitting formulas, and the wearer preferences for speech and noise.

3. Performing a hearing test, performing a noise tolerance test, determining wearer preferences for speech and noise, and generating fine-tuned speech and noise fitting curves with SNR-based tuning based on the results of the hearing test, the results of the noise tolerance test, speech and noise fitting formulas, and the wearer preferences for speech and noise.

4. Determining wearer preferences for speech and noise and generating fine-tuned speech and noise fitting curves based on predetermined fitting curves and the wearer preferences for speech and noise.

5. Performing a noise tolerance test, determining wearer preferences for speech and noise, and generating fine-tuned speech and noise fitting curves with SNR-based tuning based on predetermined fitting curves, the results of the noise tolerance test, and the wearer preferences for speech and noise.

6. Performing a hearing test and generating speech and noise fitting curves based on speech and noise fitting formulas.

7. Performing a hearing test, performing a noise tolerance test, and generating SNR-based tuning based on the results of the hearing test, the results of the noise tolerance test, and speech and noise fitting formulas.

It should be appreciated that speech fine-tuning may be performed separately from the noise fine-tuning. In other words, speech fine-tuning may be applied to the speech subsignal separately from the noise fine-tuning being applied to the noise subsignal.

It should be appreciated that in some embodiments, only wearer preferences for noise may be collected, and thus only noise fitting curves may be fine-tuned based on the wearer preferences. In some embodiments, only wearer preferences for speech may be collected, and thus only speech fitting curves may be fine-tuned based on the wearer preferences.

At step 510, a hearing aid is provided to the wearer. The hearing aid may be programmed (e.g., into the memory 213) with the speech and noise fitting curves generated at steps 506S and 506N. The hearing aid may be any of the hearing aids described herein (e.g., the ear-worn devices 100, 200, and/or 300). Thus, the speech and noise fitting curves generated as part of the process 500 may be those that are used by amplification circuitry (e.g., the amplification circuitry 110, 210, and/or 310) as described previously. In some embodiments, the fitter (e.g., an audiologist or a hearing care professional or a customer support representative) may program the hearing aid (e.g., using one of their electronic devices, such as a computer, phone, or tablet) and provide it to the wearer. In some embodiments, the wearer themselves may program the hearing aid (e.g., using one of their electronic devices, such as a computer, phone, or tablet) and provide it to themselves.

FIGS. 6-12 describe and illustrate speech and noise curves. As described above, a hearing aid (or, more generally, an ear-worn device) may use a set of fitting curves for each subsignal. For example, for each subsignal, there may be multiple gain vs. frequency curves, each for a different input level. Equivalently, for each subsignal, there may be multiple gain vs. input level curves, each for a different frequency channel. It should be appreciated that, in some embodiments, each of the speech fitting curves used by the hearing aid may have the features described, while in other embodiments, a subset (e.g., at least one) of the speech fitting curves used by the hearing aid may have the features described. In some embodiments, each of the noise fitting curves used by the hearing aid may have the features described. In some embodiments, a subset (e.g., at least one) of the noise fitting curves used by the hearing aid may have the features described. The speech and noise curves described and illustrated below may be representative of those generated at steps 506S and 506N.

Figure 7:
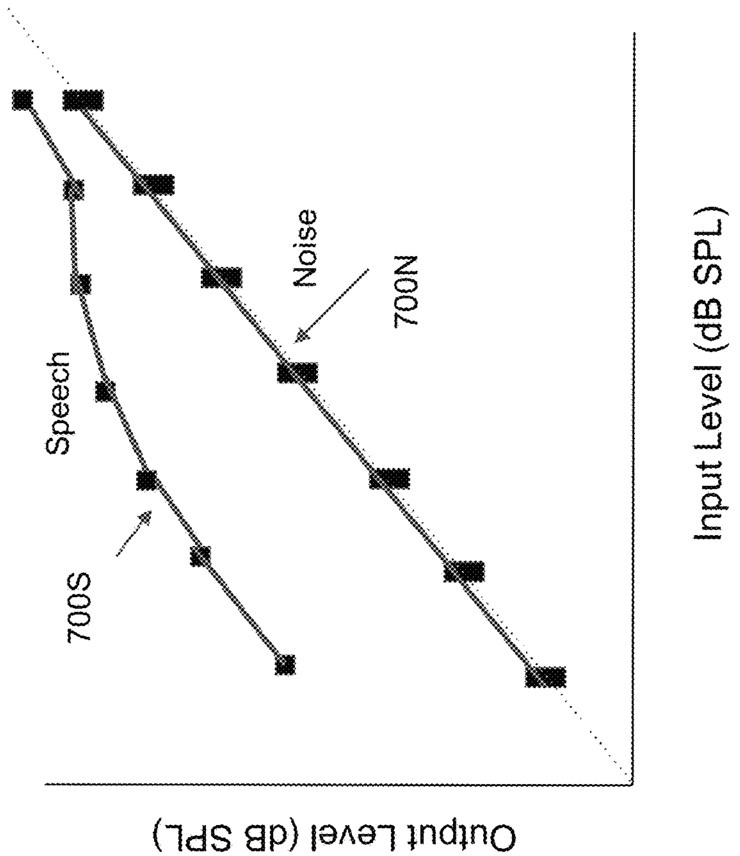
FIG. 7 illustrates a speech fitting curve and a noise fitting curve, where the fitting curves show output level vs. input level for a particular frequency channel, in accordance with certain embodiments described herein.
Figure 6:
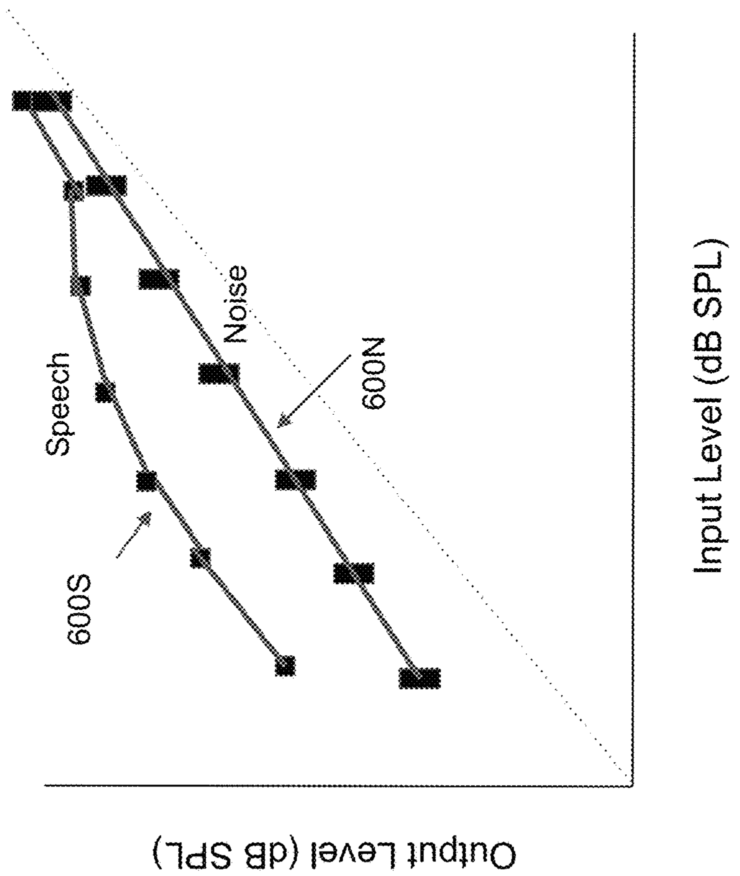
FIG. 6 illustrates a speech fitting curve and a noise fitting curve, where the fitting curves show output level vs. input level for a particular frequency channel, in accordance with certain embodiments described herein.

Some embodiments may involve applying amplification only to the speech subsignal. As an example, FIG. 6 illustrates a speech fitting curve 600S and a noise fitting curve 600N, where the fitting curves show output level vs. input level for a particular frequency channel, in accordance with certain embodiments described herein. As illustrated, the speech fitting curve 600S adds amplification for at least a portion the speech subsignal in that at least a portion of the speech fitting curve 600S is above the output=input line (shown with a dotted line), while the noise fitting curve 600N does not provide amplification for the noise subsignal in the entire noise fitting curve is on the output=line line. Some embodiments may involve applying more amplification to the speech subsignal than to the noise subsignal. As an example, FIG. 7 illustrates a speech fitting curve 700S and a noise fitting curve 700N, where the fitting curves show output level vs. input level for a particular frequency channel, in accordance with certain embodiments described herein. As illustrated, the speech fitting curve 700S adds more amplification than the noise fitting curve 700N in that the speech fitting curve 7000S is higher on the y-axis than the noise fitting curve 700N. In some embodiments, at least a portion of the speech fitting curve is higher on the y-axis than the noise fitting curve.

Figure 8:
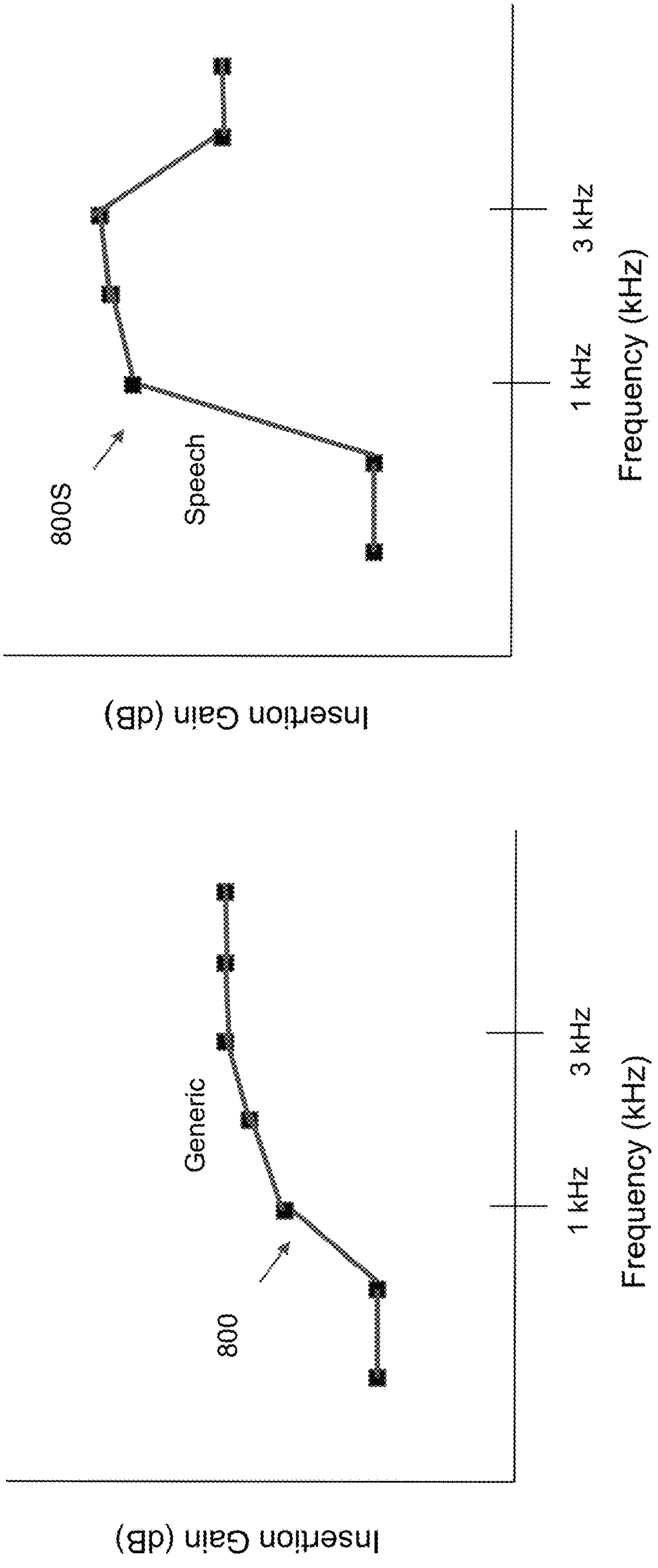
FIG. 8 illustrates a speech fitting curve and a speech fitting curve, where the fitting curves show insertion gain vs. frequency for a particular input level, in accordance with certain embodiments described herein.

Some embodiments may aim to maximize speech intelligibility by providing additional amplification in specific frequencies (e.g., within a specific frequency range) that are important parts of the speech spectrum, for example in the frequency range from 1-3 kHz, or 1-4 kHz, or 500-2 k Hz, 2-4 kHz etc., in addition to frequency regions where the wearer suffers from hearing loss. Thus, a speech fitting curve may be generated from a generic fitting curve by introducing additional amplification in a specific frequency range important for speech. For example, a constant amount of amplification may be added in this frequency range. As an example, FIG. 8 illustrates a generic fitting curve (e.g., as described with reference to the process 500) 800 and a speech fitting curve 800S, where the fitting curves show insertion gain vs. frequency for a particular input level, in accordance with certain embodiments described herein. The speech fitting curve 800Sb may be generated from the speech fitting curve 800Sa by inserting additional amplification in the frequency range 1-3 kHz.

In some embodiments, the specific frequency range in which the speech fitting curve provides additional amplification is between or equal to 500 Hz-4 kHz (e.g., 1-3 kHz, or 1-4 kHz, or 500-2 k Hz). In some embodiments, the specific frequency range in which the speech fitting curve provides additional amplification is between or equal to 500 Hz-3 kHz (e.g., 1-3 kHz or 500-2 k Hz). In some embodiments, the specific frequency range in which the speech fitting curve provides additional amplification is between or equal to 500 Hz-2 kHz (e.g., 500 Hz-2 kHz). In some embodiments, the specific frequency range in which the speech fitting curve provides additional amplification is between or equal to 1 kHz-4 kHz (e.g., 1-3 kHz, 1-4 kHz, or 500-2 k Hz). In some embodiments, the specific frequency range in which the speech fitting curve provides additional amplification is between or equal to 1 kHz-3 kHz (e.g., 1-3 kHz or 500-2 k Hz). In some embodiments, the specific frequency range in which the speech fitting curve provides additional amplification is between or equal to 1 kHz-2 kHz (e.g., 1-2 kHz). In some embodiments, the specific frequency range in which the speech fitting curve provides additional amplification is between or equal to 2 kHz-4 kHz (e.g., 2-3 kHz or 2-4 kHz). In some embodiments, the specific frequency range in which the speech fitting curve provides additional amplification is between or equal to 2 kHz-3 kHz (e.g., 2-3 kHz). In some embodiments, the specific frequency range in which the speech fitting curve provides additional amplification is between or equal to 3 kHz-4 kHz (e.g., 3-4 kHz).

In some embodiments, the gains determined for speech may be as though the speaker is in a quiet room. In some embodiments, the gains applied to the conventional signal may be larger than the gains applied in a conventional hearing aid fitting formula. In a traditional fitting formula, there is a desire to make speech comfortably audible, but these same gains, when applied to noise, may make the noise too loud, either making it annoying or uncomfortable for the wearer. By introducing sound separation as a first step, the fitting formula may continue to apply a desirable amount of gain to speech without making the overall experience too loud.

Meanwhile, a different fitting curve may be created for the background noise subsignal. In general, it may be desirable for the user to hear some background noise so as to maintain situational awareness or to experience their environment in full.

Figure 9:
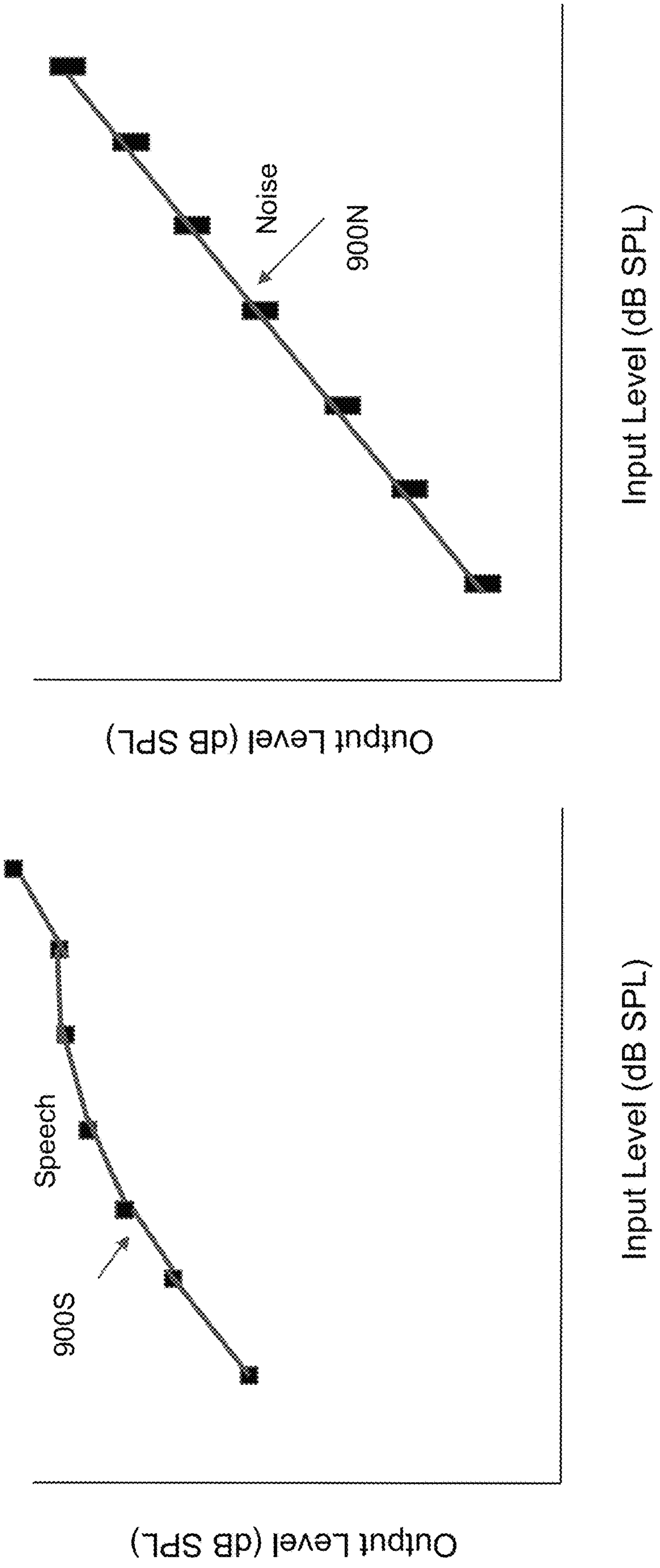
FIG. 9 illustrates a speech fitting curve and a noise fitting curve, where the fitting curves show output level vs. input level for a particular frequency channel, in accordance with certain embodiments described herein.

In some embodiments, the fitting curve (output level vs. input level) for the background noise subsignal may be more linear (which may include providing less compression) than the fitting curve for the speech signal. For example, to measure which curve is more linear, a straight line could be fit to each of the curves and statistics associated with linearity, such as R-squared, could be calculated for each fit and compared. In some embodiments, the noise fitting curve may be linear. As an example, FIG. 9 illustrates a speech fitting curve 900S and a noise fitting curve 900N, where the fitting curves show output level vs. input level for a particular frequency channel, in accordance with certain embodiments described herein. The noise fitting curve 900N is linear, while the speech fitting curve 900S is not.

Figure 10:
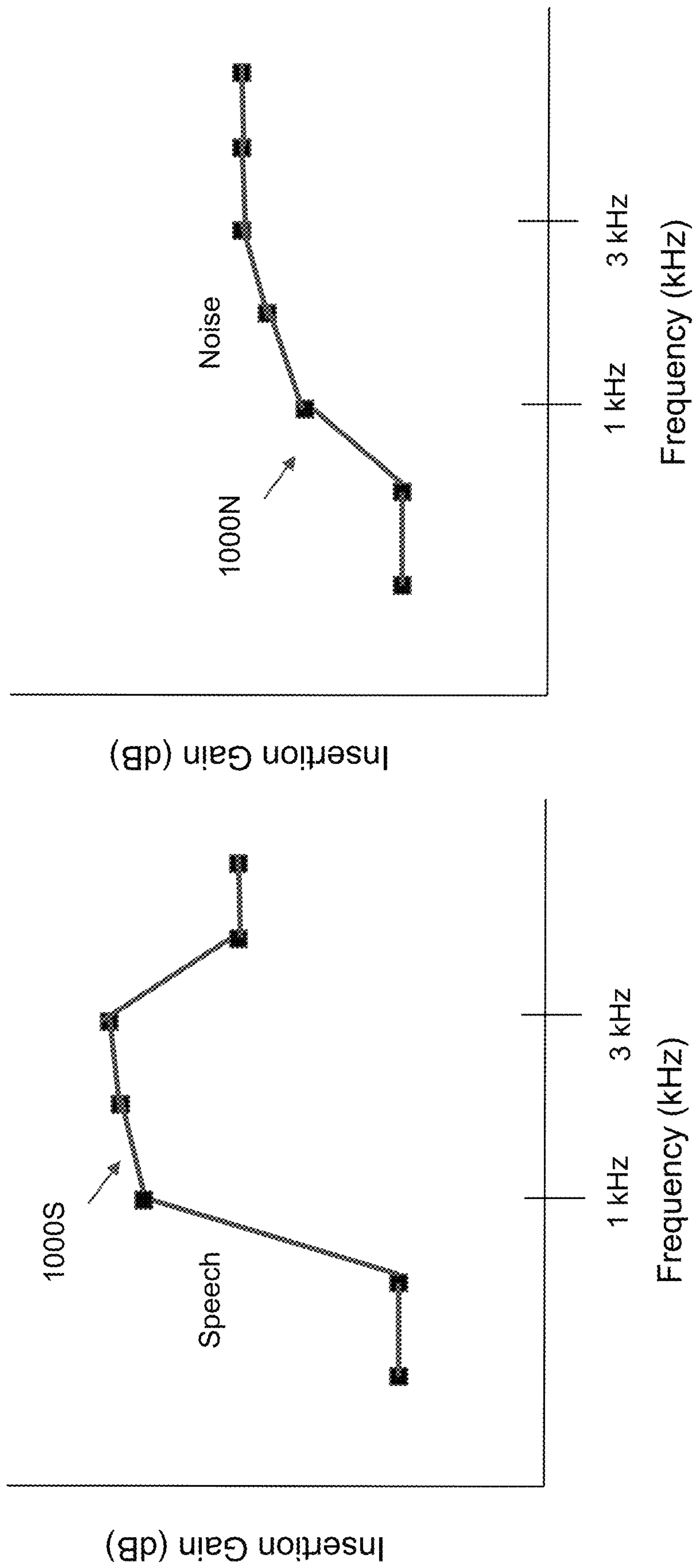
FIG. 10 illustrates a speech fitting curve and a noise fitting curve, where the fitting curves show insertion gain vs. frequency for a particular input level, in accordance with certain embodiments described herein.

With a speech signal, it may be helpful for the hearing aid to apply extra gain to quiet input levels for high frequencies so that quiet consonants are heard. This may not be preferable for the noise subsignal, in which quiet, high frequencies noises may be annoying and may mask those quiet consonants that the hearing aid is trying to ensure are heard. In some embodiments, the fitting formula for the background noise may not have the same bias toward providing extra gain for the critical components of the speech spectrum, (e.g., 1-3 kHz, 1-4 kHz, 500-2 k Hz, etc) and instead may have a frequency response that simply compensates for the person's hearing loss. In other words, the noise fitting curve may not provide additional amplification within the specific frequency range in which the speech fitting curve provides additional amplification. Thus, a generic fitting curve (e.g., as described with reference to the process 500) may be used as the noise fitting curve. This fitting curve may be modified to produce a speech fitting curve by inserting additional amplification for critical components of the speech, for example as described with reference to FIG. 8. As an example, FIG. 10 illustrates a speech fitting curve 1000S and a noise fitting curve 1000N, where the fitting curves show insertion gain vs. frequency for a particular input level, in accordance with certain embodiments described herein. The noise fitting curve 1000N may be a generic fitting curve (e.g., as described with reference to the process 500). The speech fitting curve 100S may be generated from the same curve as the noise fitting curve 1000N by inserting additional amplification in the frequency range 1-3 kHz.

Figure 11:
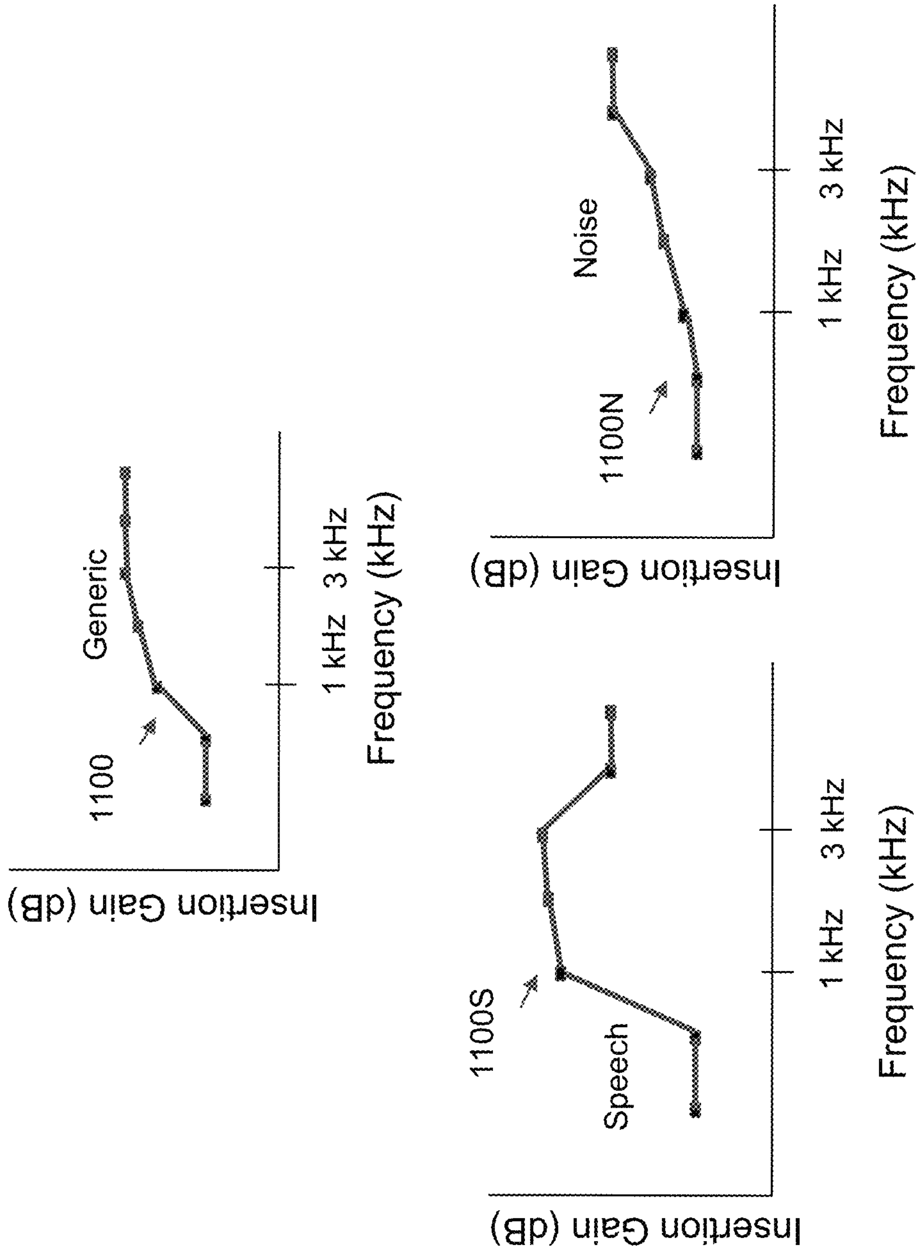
FIG. 11 illustrates a fitting curve, a speech fitting curve, and a noise fitting curve, where the fitting curves show insertion gain vs. frequency for a particular input level, in accordance with certain embodiments described herein.

In some embodiments, the frequency response for the background noise may have an opposite frequency bias so as to better protect speech signals from competing noise. In other words, the noise fitting curve may subtract amplification within the specific frequency range in which the speech fitting curve adds additional amplification. For example, as described above with reference to FIG. 8, additional amplification may be inserted into a speech fitting curve in a frequency range important for speech (e.g., 1-3 kHz or 1-4 kHz, 500-2 k Hz, etc). In some embodiments, the amount of amplification added to the speech fitting curve in the frequency range important for speech may be subtracted from the noise fitting curve in the same frequency range. In some embodiments, an amount smaller than the amplification added to the speech fitting curve in the frequency range important for speech may be subtracted from the noise fitting curve in the same frequency range. In some embodiments, an amount larger than the amplification added to the speech fitting curve in the frequency range important for speech may be subtracted from the noise fitting curve in the same frequency range. In other words, the speech fitting curve may provide additional amplification within a specific frequency range above amplification provided by the noise fitting curve, and the speech and noise fitting curves may be the same or approximately the same outside of the specific frequency range. As an example, FIG. 11 illustrates a generic fitting curve 1100 (e.g., as described with reference to the process 500), a speech fitting curve 1100S, and a noise fitting curve 1100N, where the fitting curves show insertion gain vs. frequency for a particular input level, in accordance with certain embodiments described herein. The speech fitting curve 1100S is generated from the fitting curve 1100 by inserting additional amplification in the frequency range 1-3 kHz. The noise fitting curve 1100N is generated from the fitting curve 1100 by subtracting amplification in the frequency range 1-3 kHz. In the example of FIG. 11, the amount subtracted to produce the noise fitting curve 1100N is the same amount added in this frequency range to produce the speech fitting curve 1100S.

Figure 12:
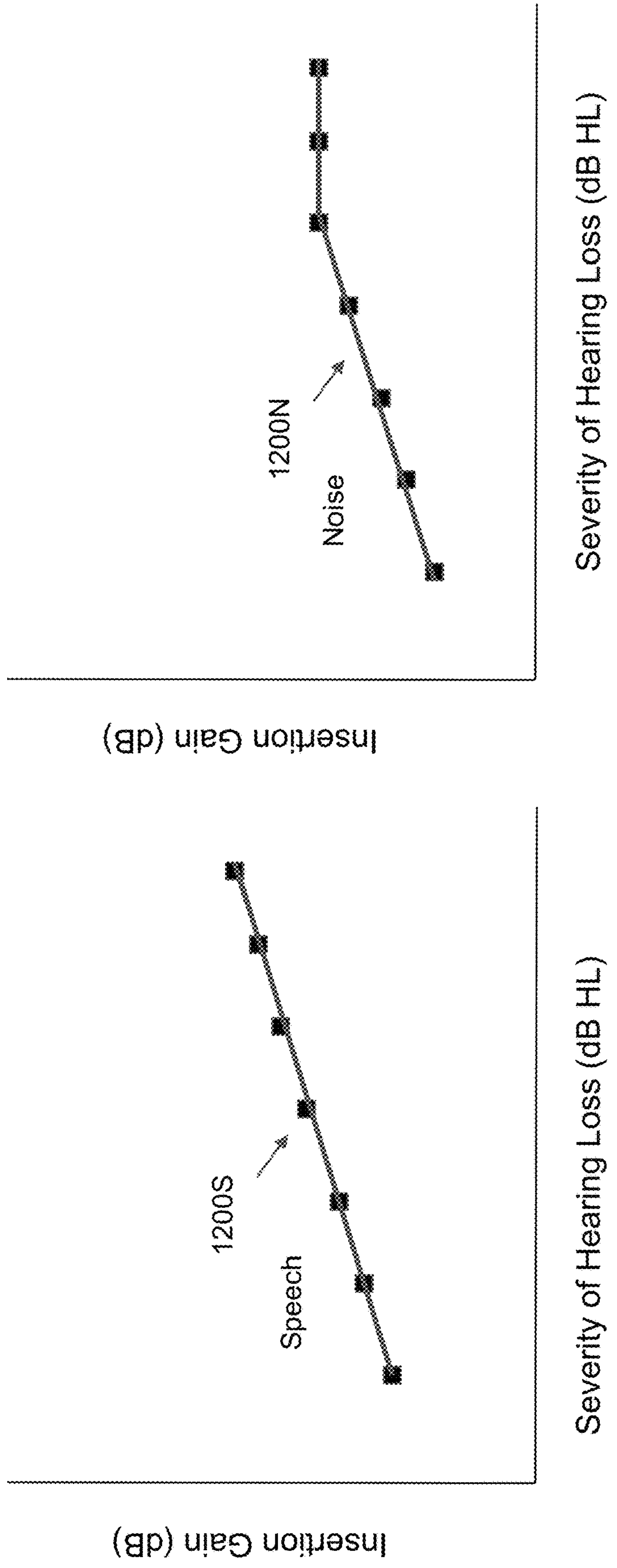
FIG. 12 illustrates graphs of insertion gain vs. severity of hearing loss at a particular frequency and input level, in accordance with certain embodiments described herein.

In some embodiments, the gains applied to the background noise signal may decrease with the level of hearing loss. For example, if someone has severe hearing loss at a particular frequency, they may struggle to understand speech sounds at that frequency. Not amplifying the noise at that particular frequency may provide the SNR boost needed for them to understand. So whereas the amount of gain applied to a speech signal may typically increase with the degree of hearing loss at a certain frequency up to the point of profound levels of hearing loss, for noise, the amplification provided may at some point level off or start to decrease as the degree of hearing loss increases into moderate or severe levels at a given frequency. As an example, FIG. 12 illustrates graphs of insertion gain vs. severity of hearing loss at a particular frequency and input level, in accordance with certain embodiments described herein. The insertion gain in the speech graph 1200S increases as hearing loss becomes more severe, while the insertion gain for the noise graph 1200N first increases and then levels off as hearing loss becomes more severe. As described above, in some embodiments the insertion gain for the noise fitting curve may first increase and then decrease as hearing loss becomes more severe. FIG. 12 uses dB HL as a measure of severity of hearing loss, but other measures are possible as well.

In some embodiments, the fitting formula may itself accomplish denoising or it may be combined with denoising. For example, if the fitting formula itself accomplishes denoising, the fitting formula may apply substantially less gain to the noise subsignal. To combine it with denoising, the ultimate gains applied to the background noise signal may include two steps, where a first step applies an amount of denoising (attenuation) at all frequencies and then the second step applies a frequency-specific amount of gain at a given frequency to each subsignal. In some embodiments, this might be done in the opposite order, with the amount of frequency-dependent gain being applied before the denoising attenuation is applied. In the first case, the background noise fitting formula describes the gain to be applied to the denoised signal. In the second case, the fitting formula describes the gain to be applied to the background noise at its original input volume. In both cases, as the gains may be combined in a linear manner, the order of the operations may not be important to the end result.

Aspects of the present disclosure may further include setting the gains for a given subsignal based in part on characteristics of the other subsignals. For example, after dividing the original signal into speech and noise, the signal-to-noise ratio (SNR) may be estimated by measuring the power of the estimated speech subsignal and the estimated noise subsignal. The estimated speech signal and estimated noise signal may be determined as described in the '169 publication. This may be an additional useful factor in setting the gains for each of the separate subsignals.

Figure 13:
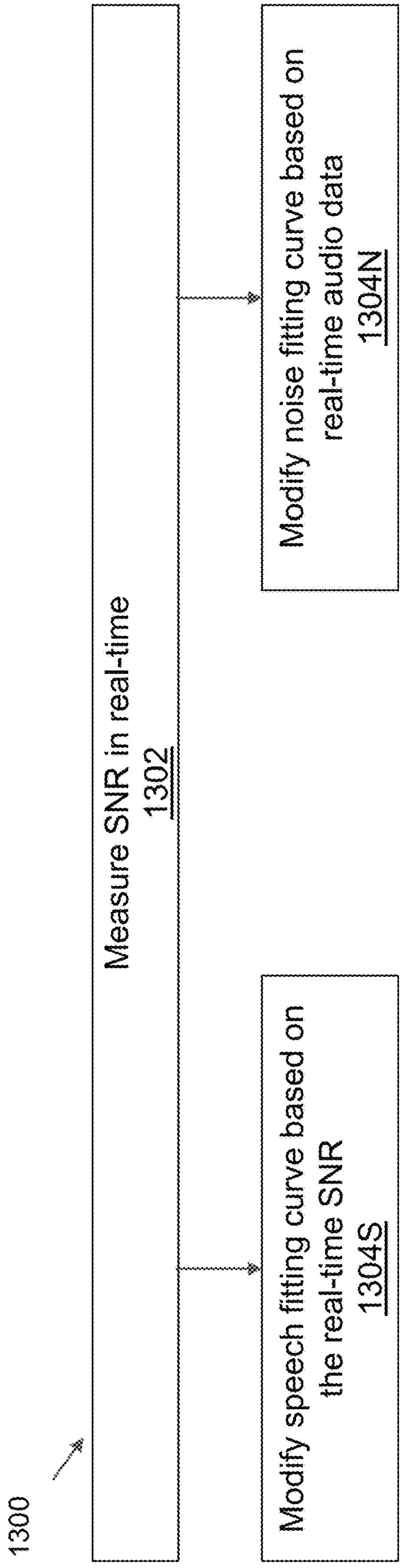
FIG. 13 illustrates a process for modifying fitting curves, in accordance with certain embodiments described herein.

FIG. 13 illustrates a process 1300 for modifying fitting curves, in accordance with certain embodiments described herein. A hearing aid (e.g., the ear-worn devices 100, 200, and/or 300) may be configured to perform the process 1300. At step 1302, the hearing aid measures SNR in real-time. In other words, the hearing aid may measure SNR based on audio currently received by the hearing aid. The SNR may be calculated at a frequency-channel level, aggregated across channels, or calculated on the original signal. At steps 1304S and 1304N, speech and noise fitting curves, respectively, may be modified based on the SNR measured at step 1302. The speech and noise fitting curves may be those generated at steps 506S and 506N. It should be appreciated that the process 1300 may be combined with the process 400, such that the modified curves are applied to the input audio signal.

For example, in some embodiments, as part of a fitting process (e.g., the process 500) a set of frequency-dependent gains ($S_{Quiet}$) for amplifying speech in a quiet room may be determined. A second set of frequency-dependent gains ($N_{Quiet}$) for amplifying noise when no speech is present are determined. In other words, the methods provide prescribed gains to fully restore audibility such that the output signal is entirely within the wearer's remaining dynamic range. The knowledge of the SNR (collected at step 1302) then may allow further modification of the gains (at steps 1304S and 1304N) so as to also ensure a tolerable signal-to-noise ratio (even perhaps at the expense of making the noise fully audible). For example, if a patient needs a certain level of SNR in order to understand speech, for a given level of speech, the gains for the speech signal can be increased (at step 1304S) as the level of background noise increases so as to maintain a comfortable SNR, taking into account both the amplified background noise and the "direct path" (the original sound signal reaching the eardrum). Conceptually, an additional set of frequency-dependent gains of ($S_{SNR}$) may be added (at step 1304S) to $S_{Quiet}$ to determine a final insertion gain where the speech will be comfortably understood above the noise ($S_{Final}=S_{Quiet}+S_{SNR}$). Alternatively, to the extent that $N_{Quiet}$ is non-zero, $N_{Quiet}$ might be reduced (at step 1304N) by $N_{SNR}$ to lower the amplification applied to the background noise ($N_{Final}=N_{Quiet}-N_{SNR}$). In embodiments where the ear worn device is capable of significantly attenuating the direct path of sound or utilizing active noise cancellation to cancel the direct path of sound, $N_{Final}$ can result in negative insertion gains.

In other words, the hearing aid may first determine the SNR level that the wearer needs in order to understand speech. This SNR level may be first determined during a fitting process and then stored in the hearing aid. Next, based on the real-time SNR (measured at step 1302) and the SNR level that the wearer needs in order to understand speech, the hearing aid may (at steps 1304S and/or 1304N) add amplification to the speech fitting curve and/or subtract amplification from the noise fitting curve.

As an example, it might be determined during a hearing aid fitting process (e.g., the process 500) that a person with fairly mild hearing loss still struggles with background noise. Using a QuickSIN test or similar speech-in-noise test, their SNR-loss may be determined to be 8 dB (which is a moderate level). In a noisy environment, in which the incoming SNR might be 0 dB SNR, the hearing aid might determine that $S_{Quiet}$ is 10 dB gain and $N_{Quiet}$ is 4 dB gain such that the output SNR will be 6 dB without any adjustment. But this is still not good enough for someone with an SNR loss of 8 dB to understand speech. $S_{SNR}$ is then determined by applying additional gain (at least 2 dB) to the speech signal to get the output signal into the SNR range necessary for understanding.

In some embodiments, the process 1300 may be designed so as to dynamically adjust the amplification profile to maximize SNR and comfort. For example, in quiet environments, a greater SNR may be comfortably achieved by increasing $S_{SNR}$ (at step 1304S), while in a loud environment, increasing $S_{SNR}$ might be uncomfortably loud. In a loud environment, it may be desirable to apply less gain to the background noise (at step 1304N). In some scenarios, there may not be a way to achieve a comfortable SNR (for example at a concert, with an open-fit hearing aid). In such environments, the hearing aid may target a lower SNR or even not provide amplification at all. In other words, in loud environments, the hearing aid may reduce the amount of additional amplification that it might otherwise have added to the speech fitting curve.

In some embodiments in which the system includes an open-fit hearing aid, the expected SNR may consider both the original signal entering the ear and the amplified signal. But in other embodiments (e.g., a hearing aid fit with closed domes or a headphone), passive attenuation of an earpiece in the canal or active-noise-cancellation may be applied to the incoming signal, such that the original signal is attenuated. In such a scenario, the expected SNR may consider the net signal volume expected by the combination of the attenuated and amplified signals. In some embodiments, the amount of active noise cancellation may vary based on the volume of the incoming signal.

In some embodiments, in a noisy environment (e.g., SNR is below a threshold), speech fitting curves may shift up the frequency range containing additional amplification from the range used for speech in quiet environments. This may be helpful in response to the Lombard effect, in which the pitch of peoples' voices tend to move up in frequency in noisy environments.

Some embodiments may include metrics that measure how well the neural network is working or is expected to work. For example, in an extremely adversarial situation like a loud concert where the measured SNR is very negative (e.g., below a threshold such as −10 dB), effective source separation may not be feasible. In such a scenario, the gains assigned to the subsignals may be altered at steps 1304S and 1304N to take into account that the subsignals may not sound good by themselves. At an extreme, the gains for each subsignal may be set equally by frequency at steps 1304S and 1304N so that it is as though no source separation had been achieved. For example, if the estimated SNR is below a threshold such as −10 dB, then the speech and noise fitting curves may both be set at steps 1304S and 1304N to be the noise fitting curve. In alternative embodiments, such scenarios may be handled upstream, by in effect turning the neural network off.

Figure 14:
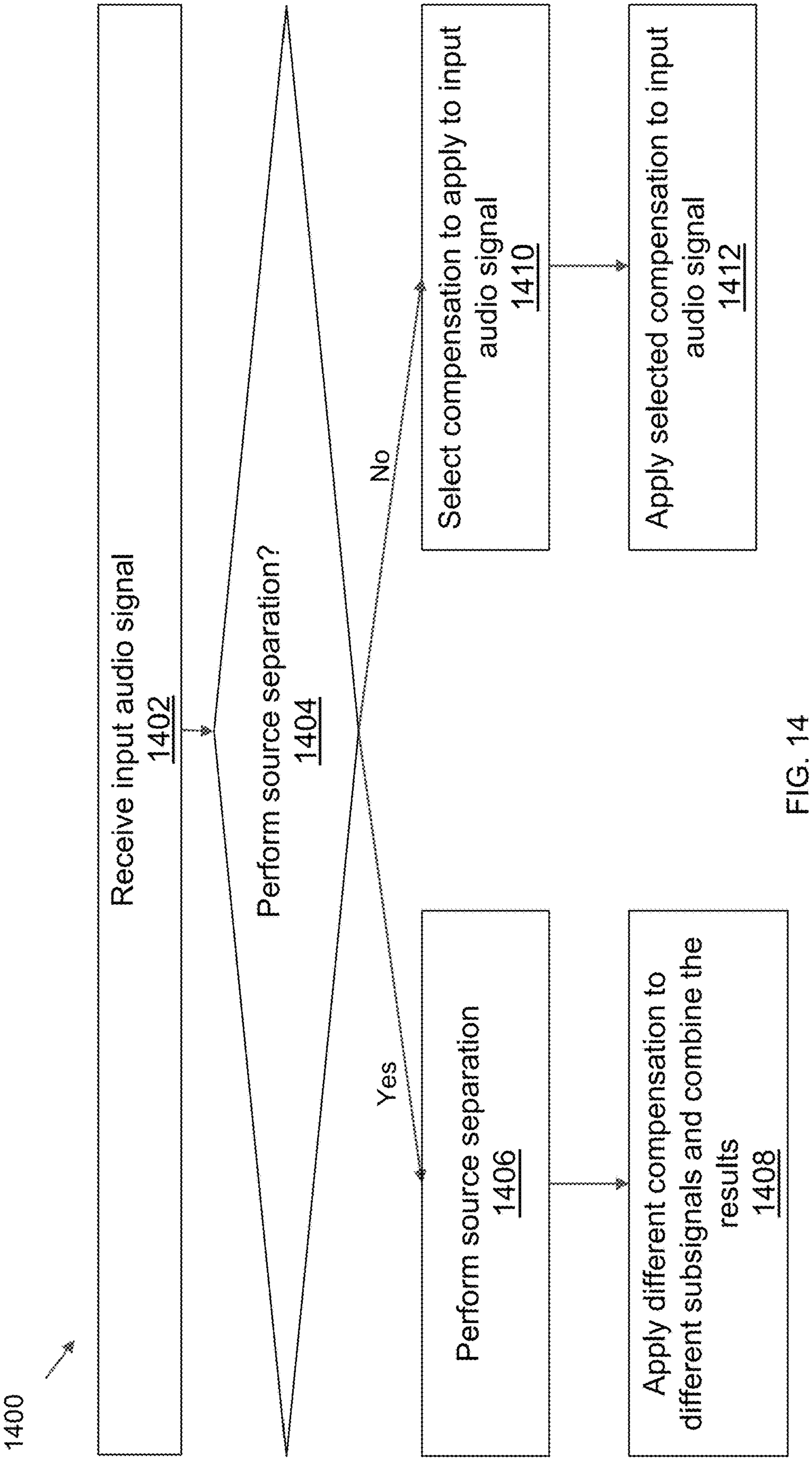
FIG. 14 illustrates a process for applying one or more fitting curves to an audio signal, in accordance with certain embodiments described herein.

Methods according to the present disclosure may be robust as to whether the acoustic environment contains speech, background noise, or both at any given time. In some scenarios, it may not be helpful to perform source separation on an incoming audio signal. In such scenarios, it may be helpful to apply one type of fitting curve to the audio signal and not source-separate the audio signal. FIG. 14 illustrates a process 1400 for applying one or more fitting curves to an audio signal, in accordance with certain embodiments described herein. The process 1400 is performed by a hearing aid (e.g., the ear-worn devices 100, 200, and/or 300). Step 1402 is the same as step 402. At step 1404, the hearing aid determines whether to perform source separation on the audio signal received at step 1402. For example, the hearing aid may include a voice activity detector or other classifier. A voice activity detector may be configured to determine whether an audio signal contains voice by processing the signals to extract and analyze (e.g., using thresholding) features of the signal such as short-term energy, zero-crossing rate, spectral characteristics, pitch, and harmonicity as non-limiting examples. The neural network trained for source separation may be engaged when there is both speech (e.g., as determined by the voice activity detector) and meaningful background noise such that it is worth the computation effort to divide signal, thus allowing the system to adjust the SNR of the final signal and apply different frequency fitting curves to the different subsignals. Accordingly, when the hearing aid determines that source separation should be performed, the process 1400 proceeds to step 1406 in which the hearing aid separates by source the audio signal received at step 1402 into different subsignals (e.g., speech and noise sub signals). The hearing aid may use a neural network implemented by neural network circuitry to perform the source separation as described above. At step 1408, the hearing aid applies different amplification to the different subsignals and combines the results. For example, if the two subsignals are a speech subsignal and a noise subsignal, the hearing aid may apply speech fitting curves described herein to the speech subsignal, apply noise fitting curves described herein to the noise subsignal, and combine the results. This is further described and illustrated with reference to FIGS. 1, 2, and 4.

Alternatively, the hearing aid may determine at step 1404 that source separation should not be performed. The hearing aid may make the determination at step 1404 using, at least in part, a voice activity detector. For example, when there is no speech (e.g., as determined by a voice activity detector), the hearing aid may determine that source separation should not be performed and proceed to step 1410. As another example, if there is only speech (e.g., as determined by a voice activity detector) and the level of background noise is below a certain threshold, the hearing aid may determine that source separation should not be performed and proceed to step 1410.

At step 1410, the hearing aid selects amplification to apply to the audio signal, and at step 1412, the hearing aid applies the selected amplification to the (non-source separated) audio signal. Thus, the hearing aid may ensure that the correct amplification is applied when the neural network trained for source separation is not needed. For example, when there is no speech, the signal should be adjusted by the method for amplifying noise; thus, the hearing aid may select noise fitting curves (e.g., any of the noise fitting curves described herein) and apply it to the input audio signal (received at step 1402). If there is only speech and the level of background noise is below a certain threshold, no source separation is needed but the whole signal should be amplified according to the method for amplifying speech; thus, the hearing aid may select speech fitting curves (e.g., any of the speech fitting curves described herein) and apply it to the input audio signal (received at step 1402).

In some embodiments, at steps 404 and/or 1406, the system may divide the incoming signal into more than two subsignals. For example, a neural network may be trained to output a different subsignal for each distinct speaker detected in the incoming audio signal. Thus, at steps 404 and/or 1406, the neural network may separate the input audio signal into multiple speech subsignals and a noise subsignal. Then, at steps 406 and/or 1408, the hearing aid may apply the speech fitting curve to each of the speech signals separately. This may yield advantages in intelligibility. For example, to the extent a compressive algorithm with a slow release time is applied to a single speech signal, the presence of a nearby speaker may cause a farther away speaker to get insufficient amplification. Separating and amplifying each speaker separately may remove this concern. Neural network models trained in source separation may be trained to separate signals from different speakers, enabling this type of solution.

In embodiments in which the hearing aid separates signals into subsignals for different speakers and applies a speech fitting curve to each subsignal, separate WDRC may be performed for each speech subsignal separately. In such embodiments, the WDRC applied separately for each speaker may apply more compression with a slower attack and release time than would a system that applied single WDRC processing for all speakers together. This may allow quiet speakers to be given a significant amount of gain, making them easy to hear, without applying too much gain to loud speakers and with minimal distortion of the envelope that would come from achieving this by implementing fast attack and release times through a normal WDRC pipeline.

In some embodiments, one of the separated speech subsignals may be the speaker's own voice. There are multiple methods by which the speaker's own voice may be identified. In one method, the neural network may accept a voice signature as an input that represents the voice fingerprint of the speaker, and the neural network may be trained to output an audio stream that is that speaker's voice as distinct from other speakers voices. This may allow for a different fitting curve to be applied to it. Thus, at steps 404 and/or 1406, the neural network may separate the input audio signal into a speech signal, an own-voice subsignal, and a noise subsignal. Then, at steps 406 and/or 1408, the hearing aid may apply the speech fitting curve to the speech subsignal and an own-voice fitting curve to the own-voice subsignal, and the speech fitting curve and the own-voice fitting curves may be different. In some embodiments, the neural network performs source separation of speech from noise, but then a second step determines whether the wearer is talking. This can be done by comparing the voice signature of the speaker to a target voice signature, for example by taking the cosine similarity between the two vectors. Alternatively, data from other sensors, like accelerometers, IMUs (inertial measurement units) or microphones in the ear canal may be used to obtain an indicator that the user is speaking. Further description of such voice personalization may be found in U.S. patent application Ser. No. 18/097,154 (the '154 application) filed Jan. 3, 2023 and entitled "System And Method for Enhancing Speech of Target Speaker from Audio Signal in an Ear-Worn Device Using Voice Signatures." The '154 application is incorporated by reference herein in its entirety.

Figure 15:
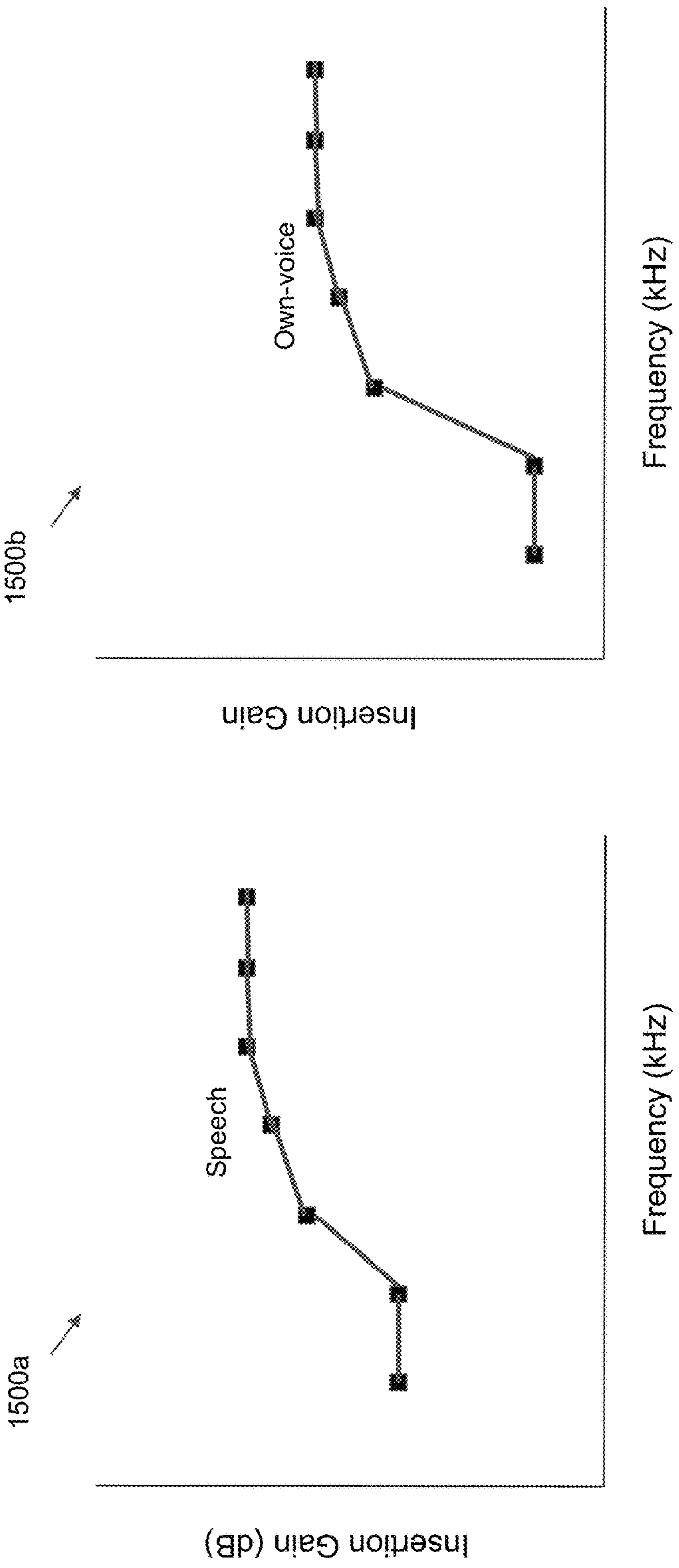
FIG. 15 illustrates a speech fitting curve and an own-voice fitting curve, where the fitting curves show frequency vs. insertion gain, in accordance with certain embodiments described herein.

The ideal fitting curve for the speaker's own voice may be different from that for other speakers. When one is speaking, intelligibility is not a consideration; one knows what one is saying. Instead, the ideal fitting curve may take into account both any occlusion effect that occurs from having something in the ear and the typical acoustic effects of sound that arrives at the ear via bone-conduction. Typically, hearing aid wearers are not used to hearing their own voice amplified, so in some embodiments the own-voice fitting curve may provide less gain than the speech fitting curve for a different voice at the same volume. Additionally, hearing aid wearers typically prefer less low-frequency amplification of their own voice, so the fitting curve for the wearer's own voice may substantially reduce gains in the low frequencies. In some embodiments, an own-voice fitting curve may have less gain in low frequencies than a speech fitting curve (i.e., a fitting curve for speakers who are not the wearer). In some embodiments, an own-voice fitting curve may set gains to negative values in low frequencies. In some embodiments, an own-voice subsignal may be high-passed with a filter. In some embodiments, the fitting curve for own-voice substantially reduces gains in a frequency range below 1000 Hz (e.g., below 900 Hz, or below 800 Hz, or below 700 Hz, etc.). In some embodiments, the fitting curve for own-voice substantially reduces gains in a frequency range below 750 Hz. In some embodiments, the fitting curve for own-voice substantially reduces gains in a frequency range below 500 Hz. In some embodiments, the fitting curve for own-voice substantially reduces gains in a frequency range below 300 Hz. In some embodiments, the fitting curve for own-voice substantially reduces gains in a frequency range below 200 Hz. As an example, FIG. 15 illustrates a speech fitting curve **1500*a* (i.e., a fitting curve for speech not including the wearer's own voice) and an own-voice fitting curve 1500*b*, where the fitting curves show frequency vs. insertion gain, in accordance with certain embodiments described herein. As illustrated, the own-voice fitting curve 1500*b* reduces low-frequency gains and generally provides less amplification compared to the speech fitting curve 1500*a***.

In some embodiments, the gain curve for own-voice may be generated during an "own-voice fitting" by allowing the user to tune parameters such as gain and/or frequency cutoff on their own voice until it sounds natural to them. In other words, the user may describe whether their own voice sounds loud, or boomy, to them, and the fitter may adjust the parameters for own-voice specifically until the user's complaints are solved. In some embodiments where the user is self-fitting, the user may do this automatically in an app, where they can alter a volume parameter and a frequency-cutoff parameter to change the sound of their own voice until it sounds good to them. It should thus be appreciated that an own-voice fitting process may be performed to generate own-voice fitting curves as part of the process 500.

In some embodiments, the own-voice fitting concept may be achieved even without separating the speaker's own voice from other voices. Instead, it may rely upon the heuristic that the speaker's own voice will generally be louder at the microphone than that of conversation partners. Therefore, the speech fitting process (e.g., the process 500) may include an own-voice fitting sub-process in which the own-voice fitting is used to set gains for loud speech (perhaps measuring the input volume of the users speech at the microphone), while the rest of the speech fitting process sets the gains for quiet and normal level speech. In other words, the speech fitting process may include an own-voice fitting subprocess and a non-own voice speech fitting subprocess. Results from the own-voice fitting subprocess may be used to set gains for loud speech, and results from a non-own-voice speech fitting subprocess may be used for quiet and normal level speech. By interpolating between these different gains, the whole fitting curve for speech may be derived while maximizing the naturalness of the user's own speech and while preserving the necessary amplification for other people's speech.

In some embodiments, the methods and systems described herein may allow a professional technician or audiologist to determine the inputs to the various fitting curves. They may use software to "program" the fitting curves. In other embodiments, the device may be self-fitting, such that an individual can go through a series of steps in software, for example running in an app on a smartphone, that allows them to "fit" the device to their own hearing loss.

Figure 16:
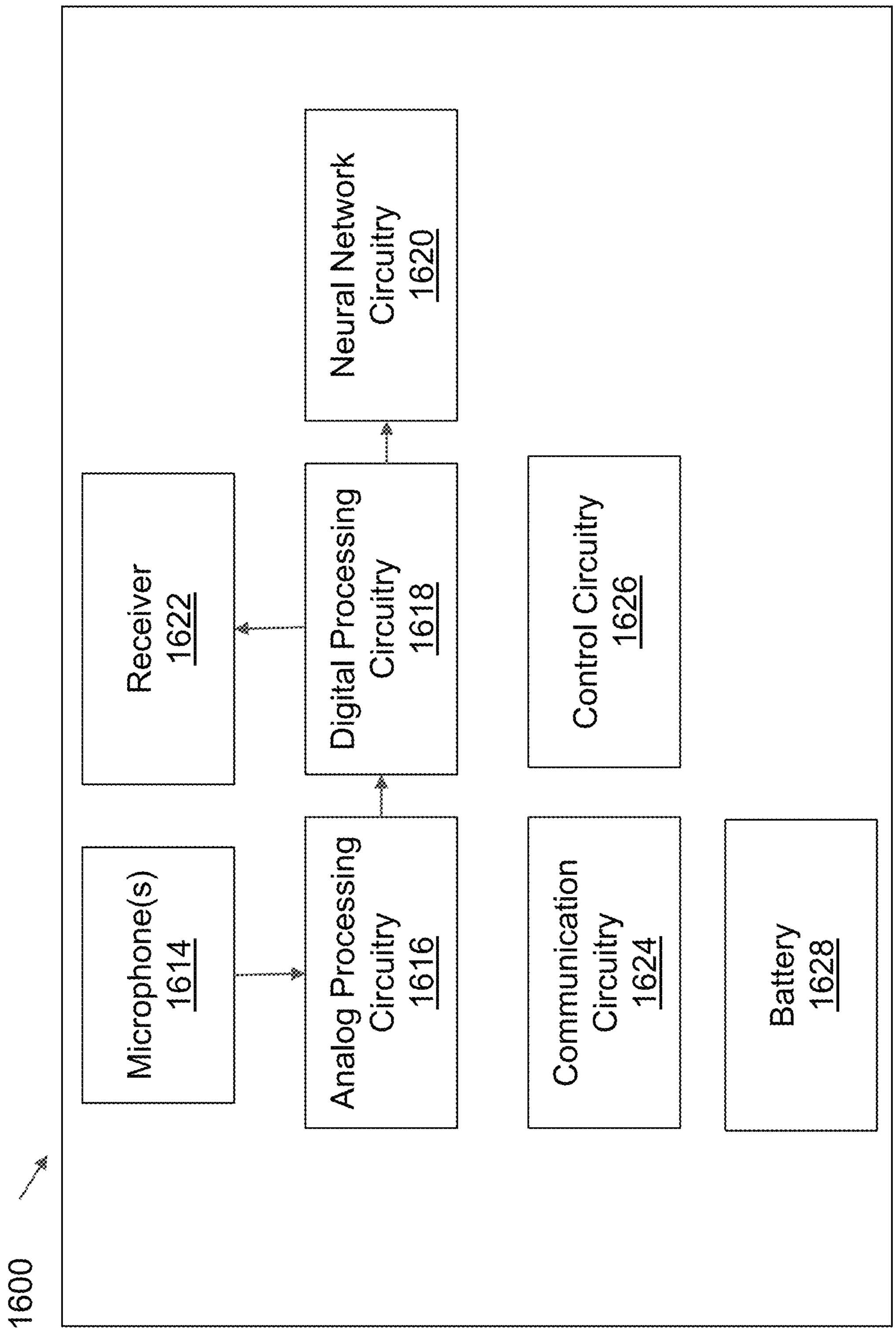
FIG. 16 illustrates a block diagram of an ear-worn device, in accordance with certain embodiments described herein.

FIG. 16 illustrates a block diagram of an ear-worn device (e.g., a hearing aid) 1600, in accordance with certain embodiments described herein. The ear-worn device 1600 may be any of the ear-worn devices and/or hearing aids described herein (e.g., the ear-worn devices 100, 200, and/or 300). The ear-worn device 1600 includes one or more microphones 1614, analog processing circuitry 1616, digital processing circuitry 1618, neural network circuitry 1620, a receiver 1622, communication circuitry 1624, control circuitry 1626, and a battery 1628. It should be appreciated that the ear-worn device 1600 may include more elements than illustrated.

The one or more microphones 1614 may be configured to receive sound and convert the sound to analog electrical signals. The analog processing circuitry 1616 may be configured to receive the analog electrical signals representing the sound and perform various analog processing on them, such as pre-amplification, filtering, and conversion to digital signals. The digital processing circuitry 1618 (which may be the same as the digital processing circuitry 106, 206, and/or 306) may be configured to receive the digital signals from the analog processing circuitry 1616 and perform various digital processing on them, such as wind reduction, beamforming, anti-feedback processing, Fourier transformation, input calibration, wide-dynamic range compression, output calibration, and inverse Fourier transformation. The digital processing circuitry 1618 may be configured to apply or modify fitting curves in any of the manners described herein.

The neural network circuitry 1620 (which may be the same as the neural network circuitry 102) may be configured to receive the digital signals from the digital processing circuitry 1618 and process the signals with a neural network to perform source separation as described above. The neural network circuitry 1620 may implement any of the neural networks described herein. The outputs of the neural network circuitry 1620 (e.g., source-separated subsignals) may be routed back to the digital processing circuitry 1618 for further processing (e.g., for application of fitting curves). The receiver 1622 may be configured to receive the final audio signals and output them as sound to the user.

In some embodiments, the analog processing circuitry 1616 may be implemented on a single chip (i.e., a single semiconductor die or substrate). In some embodiments, the digital processing circuitry 1618 may be implemented on a single chip. In some embodiments, the neural network circuitry 1620 may be implemented on a single chip. In some embodiments, the analog processing circuitry 1616 (or a portion thereof) and the digital processing circuitry 1618 (or a portion thereof) may be implemented on a single chip. In some embodiments, the digital processing circuitry 1618 (or a portion thereof) and the neural network circuitry 1620 (or a portion thereof) may be implemented on a single chip. In some embodiments, the analog processing circuitry 1616 (or a portion thereof), the digital processing circuitry 1618 (or a portion thereof), and the neural network circuitry 1620 (or a portion thereof) may be implemented on a single chip. In some embodiments, denoised signals output by the neural network circuitry 1620 on one chip may be routed to a different chip (e.g., a chip including digital processing circuitry 1618 and/or analog processing circuitry 1616) which may then route them to the receiver 1622 for output to the user.

The communication circuitry 1624 may be configured to communicate with other devices over wireless connections, such as Bluetooth, WiFi, LTE, or NFMI connections Bluetooth connections. The control circuitry 1626 may be configured to control operation of the one or more microphone(s) 1614, the analog processing circuitry 1616, the digital processing circuitry 1618, the neural network circuitry 1620, the communication circuitry 1624, and/or the receiver 1622. The control circuitry 1626 may be configured to perform this control based on instructions or parameters received by the communication circuitry 1624 from other devices over wireless connections. The battery 1628 may provide power to the ear-worn device 1600.

Figure 17:
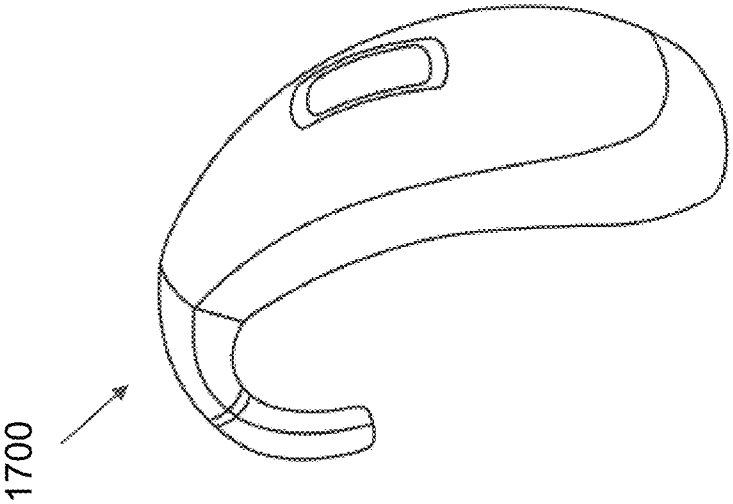
FIG. 17 illustrates an example hearing aid, in accordance with certain embodiments described herein.

FIG. 17 illustrates an example hearing aid 1700, in accordance with certain embodiments described herein. The hearing aid 1700 may be any of the hearing aids and/or ear-worn devices described herein (e.g., the ear-worn devices 100, 200, 300, and/or 1600).

Figure 18:
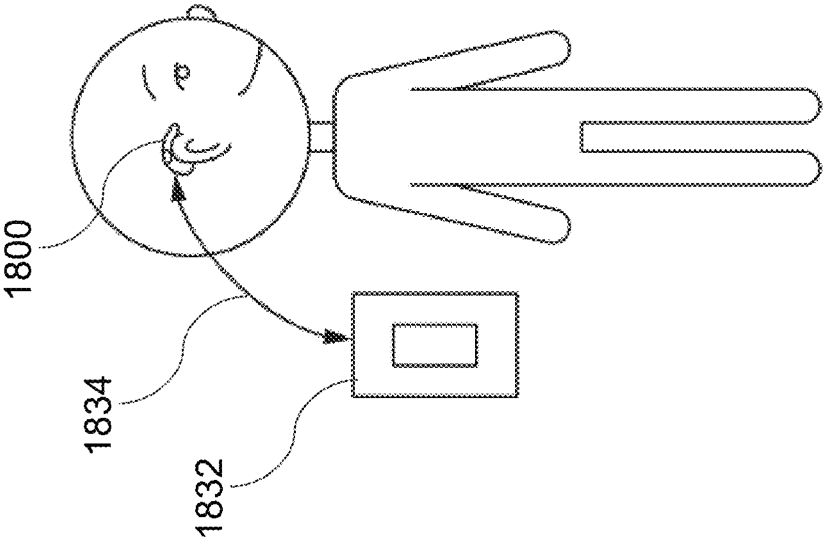
FIG. 18 illustrates an example hearing aid worn by a user, in accordance with certain embodiments described herein.

FIG. 18 illustrates an example hearing aid 1800 worn by a user 1830, in accordance with certain embodiments described herein. The hearing aid 1800 may be any of the hearing aids and/or ear-worn devices described herein (e.g., the ear-worn devices 100, 200, 300, 1600 and/or the hearing aid 1700). FIG. 18 further illustrates a processing device 1832 and a wireless connection 1834. The processing device 1832 may be used by the user 1830 and may be, for example, a phone, watch, tablet, or processing device dedicated for use with the hearing aid 1800. The wireless connection 1834, which may be, for example, a Bluetooth, WiFi, LTE (Long-Term Evolution), or NFMI (Near-field magnetic induction) connection, connects the processing device 1832 and the hearing aid 1800 such that the processing device 1832 is in operative communication with the hearing aid 1800. Thus, the processing device 1832 may transmit commands to the hearing aid 1800 to configure it and control its operation, and the processing device 1832 may also receive communication from the hearing aid 1800, such as information about the hearing aid 1800's status. It should be appreciated that while for simplicity, a single hearing aid 1800 is illustrated on one ear of the user 1830, another hearing aid may be worn on the other ear of the user 1830. The wireless connection 1834 may be a single connection connecting the processing device 1832 to each of the hearing aids, or may include two individual wireless connections, each connecting to one hearing aid.

While the above description has focused on hearing aids as an example of ear-worn devices, the description may also apply to other ear-worn devices, such as cochlear implants or earphones.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above may comprise hardware, software or a combination of hardware and software.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be objects of this disclosure. Accordingly, the foregoing description and drawings are by way of example only.

What is claimed is:

1. An ear-worn device, comprising:
- a speech wide-dynamic range compression (WDRC) pipeline configured to perform WDRC on a speech subsignal of an input audio signal, the speech WDRC pipeline comprising:
  - a set of speech subsignal level estimation circuitry configured to determine levels of the speech subsignal; and
  - a set of speech subsignal amplification circuitry configured to apply a set of speech fitting curves to the speech subsignal based at least in part on the levels of the speech subsignal; and
- a noise WDRC pipeline configured to perform WDRC on a noise subsignal of the input audio signal, the noise WDRC pipeline comprising:
  - a set of noise subsignal level estimation circuitry configured to determine levels of the noise subsignal; and
  - a set of noise subsignal amplification circuitry configured to apply a set of noise fitting curves to the noise subsignal based at least in part on the levels of the noise subsignal;
  - wherein the set of speech fitting curves is different from the set of noise fitting curves.

2. The ear-worn device of claim 1, wherein at least one speech fitting curve of the set of speech fitting curves provides amplification and at least one noise fitting curve of the set of noise fitting curves does not provide amplification.

3. The ear-worn device of claim 1, wherein at least one speech fitting curve of the set of speech fitting curves provides more amplification than at least one noise fitting curve of the set of noise fitting curves.

4. The ear-worn device of claim 1, wherein at least one speech fitting curve of the set of speech fitting curves provides additional amplification within a specific frequency range above amplification provided by at least one noise fitting curve of the set of noise fitting curves, and the specific frequency range is between or equal to 500 Hz-4 kHz.

5. The ear-worn device of claim 4, wherein the at least one speech fitting curve and the at least one noise fitting curve are approximately the same outside of the specific frequency range.

6. The ear-worn device of claim 1, wherein at least one noise fitting curve of the set of noise fitting curves is more linear than at least one speech fitting curve of the set of speech fitting curves.

7. The ear-worn device of claim 1, wherein the ear-worn device further comprises memory storing the set of speech fitting curves and the set of noise fitting curves.

8. The ear-worn device of claim 1, wherein the ear-worn device is further configured to:
- measure a real-time signal-to-noise ratio (SNR) of the input audio signal; and
- modify at least one speech fitting curve of the set of speech fitting curves and/or at least one noise fitting curve of the set of noise fitting curves based on the real-time SNR.

9. The ear-worn device of claim 8, wherein the ear-worn device is configured, when modifying the at least one speech fitting curve and/or the at least one noise fitting curve based on the real-time SNR, to:
- determine an SNR level that a wearer needs in order to understand speech; and
- based on the real-time SNR and the SNR level that the wearer needs in order to understand speech, add amplification to the at least one speech fitting curve and/or subtract amplification from the at least one noise fitting curve.

10. The ear-worn device of claim 8, wherein the ear-worn device is further configured to make the at least one speech fitting curve equal to the at least one noise fitting curve when the real-time SNR is below a threshold.

11. The ear-worn device of claim 1, wherein the ear-worn device is further configured to:
- determine whether to separate the input audio signal into the speech subsignal and the noise subsignal; and
- based on determining not to separate:
  - select amplification to apply to the input audio signal; and
  - apply the amplification to the input audio signal.

12. The ear-worn device of claim 11, wherein the ear-worn device is configured, when selecting the amplification to apply to the input audio signal, to:
- select the set of noise fitting curves when there is no speech; and
- select the set of speech fitting curves when there is speech and a level of background noise is below a certain threshold.

13. The ear-worn device of claim 1, wherein the speech subsignal is a first speech subsignal of multiple speech subsignals corresponding to different speakers, and the ear-worn device is configured to:
- separate the input audio signal into the multiple speech subsignals and the noise subsignal; and
- apply the set of speech fitting curves to each of the multiple speech subsignals separately.

14. The ear-worn device of claim 1, wherein the ear-worn device is configured to:
- separate the input audio signal into the speech subsignal, the noise subsignal, and an own-voice subsignal; and
- apply a set of own-voice fitting curves to the own-voice subsignal, wherein the set of own-voice fitting curves is different from the set of speech fitting curves.

15. The ear-worn device of claim 14, wherein at least one own-voice fitting curve of the set of own-voice fitting curves provides less amplification than at least one speech fitting curve of the set of speech fitting curves.

16. The ear-worn device of claim 15 wherein:

the at least one own-voice fitting curve provides less gains in a frequency range that is below 1000 Hz than the at least one speech fitting curve;

the at least one own-voice fitting curve provides negative gains in the frequency range that is below 1000 Hz; or the ear-worn device is configured to high-pass filter the own-voice subsignal.

17. The ear-worn device of claim 1, further comprising neural network circuitry configured to implement a neural network trained to separate the speech subsignal and the noise subsignal from an input audio signal.

18. The ear-worn device of claim 17, wherein the neural network trained to separate the speech subsignal and the noise subsignal from the input audio signal comprises a recurrent neural network.

19. The ear-worn device of claim 17, wherein the neural network circuitry is implemented on a single chip.

20. The ear-worn device of claim 1, wherein the ear-worn device comprises a hearing aid.

* * * * *